US010885104B2

(12) United States Patent
Grue et al.

(10) Patent No.: US 10,885,104 B2
(45) Date of Patent: Jan. 5, 2021

(54) SYSTEMS AND METHODS FOR SELECTING CONTENT ITEMS TO STORE AND PRESENT LOCALLY ON A USER DEVICE

(71) Applicant: Dropbox, Inc., San Francisco, CA (US)

(72) Inventors: Anthony Grue, San Francisco, CA (US); Andrew Haven, San Francisco, CA (US); Andrew Scheff, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 856 days.

(21) Appl. No.: 14/247,468

(22) Filed: Apr. 8, 2014

(65) Prior Publication Data

US 2015/0242443 A1    Aug. 27, 2015

Related U.S. Application Data

(60) Provisional application No. 61/945,808, filed on Feb. 27, 2014.

(51) Int. Cl.
*G06F 3/00* (2006.01)
*G06F 16/58* (2019.01)
(Continued)

(52) U.S. Cl.
CPC .... *G06F 16/5866* (2019.01); *G06F 16/24578* (2019.01); *G06F 16/9535* (2019.01); *G06Q 50/01* (2013.01)

(58) Field of Classification Search
CPC .... G06F 3/048; G06F 3/0484; G06F 16/5866; G06F 16/9535; G06F 16/24578; G06Q 50/01
See application file for complete search history.

(56) References Cited

U.S. PATENT DOCUMENTS 4,475,172 A * 10/1984 Frederiksen ............ A63F 13/00
345/440
5,321,520 A    6/1994 Inga et al.
(Continued)

FOREIGN PATENT DOCUMENTS

JP    2006244221 A    9/2006
JP    2007502092 A    2/2007
(Continued)

OTHER PUBLICATIONS

Bieber G., et al., "TiDi Browser: A Novel Photo Browsing Technique for Mobile Devices," Proceeding of SPIE, Feb. 15, 2007, vol. 6507, pp. 1-8.
(Continued)

*Primary Examiner* — Kieu D Vu
*Assistant Examiner* — Andrew Chung
(74) *Attorney, Agent, or Firm* — Keller Jolley Preece

(57) ABSTRACT

Systems, methods, and non-transitory computer readable media for dynamically selecting and sending content items to a user device based on various network and device conditions are provided. In some embodiments, a listing of images stored within a user account on a content management system may be generated, and a selection probability value may be assigned to each image within the listing. An available capacity level on the user device may be determined, and images may be dynamically selected to be sent to the user device based on the determined available capacity level and each image's selection probability value. In some embodiments, each image's selection probability value may be based on one or more factors. For example, images that have been recently viewed, recently added to a collection of images, and/or shared within a shared virtual space created by the user, may receive higher selection probability values than other images. In some embodiments, (Continued)

US 10,885,104 B2

Page 2 the selected images may be ranked in order of priority for transmission to the user device and sent to the user device in order of rank.

28 Claims, 12 Drawing Sheets

(51) Int. Cl.
    *G06F 16/9535*      (2019.01)
    *G06F 16/2457*      (2019.01)
    *G06Q 50/00*      (2012.01)

(56) References Cited

U.S. PATENT DOCUMENTS

| | | | |
|---|---|---|---|
| 5,920,327 A | 7/1999 | Seidensticker, Jr. et al. | |
| 5,983,263 A * | 11/1999 | Rothrock | H04N 7/147 |
| | | | 348/E7.081 |
| 6,122,411 A * | 9/2000 | Shen | G06T 1/60 |
| | | | 358/404 |
| 6,144,996 A | 11/2000 | Starnes et al. | |
| 6,281,874 B1 | 8/2001 | Sivan et al. | |
| 6,496,206 B1 | 12/2002 | Mernyk et al. | |
| 6,545,687 B2 | 4/2003 | Scott et al. | |
| 6,549,674 B1 * | 4/2003 | Chui | G06F 3/0481 |
| | | | 375/E7.043 |
| 6,563,517 B1 | 5/2003 | Bhagwat et al. | |
| 6,578,072 B2 | 6/2003 | Watanabe et al. | |
| 6,633,608 B1 * | 10/2003 | Miller | H04N 19/61 |
| | | | 348/E5.104 |
| 6,738,155 B1 * | 5/2004 | Rosenlund | G06F 16/93 |
| | | | 358/1.15 |
| 6,898,601 B2 * | 5/2005 | Amado | G06F 17/24 |
| 7,000,188 B1 * | 2/2006 | Eustace | G11B 27/322 |
| | | | 715/716 |
| 7,092,118 B2 | 8/2006 | Ferriere et al. | |
| 7,154,621 B2 | 12/2006 | Rodriguez et al. | |
| 7,185,069 B2 | 2/2007 | Cronin, III et al. | |
| 7,423,653 B2 * | 9/2008 | Gettman | G06F 16/954 |
| | | | 345/587 |
| 7,574,653 B2 | 8/2009 | Croney et al. | |
| 7,603,409 B2 | 10/2009 | Kobayashi et al. | |
| 7,737,993 B2 | 6/2010 | Kaasila et al. | |
| 7,818,355 B2 | 10/2010 | Mills et al. | |
| 7,929,027 B2 | 4/2011 | Okamoto et al. | |
| 7,991,837 B1 | 8/2011 | Tahan et al. | |
| 8,078,230 B2 | 12/2011 | Schuler et al. | |
| 8,082,327 B2 | 12/2011 | Schlusser | |
| 8,161,179 B2 * | 4/2012 | Dote | G06F 9/451 |
| | | | 709/232 |
| 8,185,591 B1 * | 5/2012 | Lewis | G06Q 10/107 |
| | | | 358/1.15 |
| 8,208,006 B2 | 6/2012 | Martin-Cocher et al. | |
| 8,312,388 B2 | 11/2012 | Yoshihama et al. | |
| 8,411,758 B2 * | 4/2013 | Folgner | G11B 27/034 |
| | | | 375/240.26 |
| 8,417,599 B2 | 4/2013 | Wirth, Jr. et al. | |
| 8,570,335 B2 | 10/2013 | Huang et al. | |
| 8,605,348 B2 * | 12/2013 | Bosma | H04N 1/393 |
| | | | 358/1.14 |
| 8,893,026 B2 * | 11/2014 | Lindemann | G01C 11/02 |
| | | | 348/36 |
| 8,898,208 B2 | 11/2014 | Wu et al. | |
| 9,405,500 B1 * | 8/2016 | Cox | G06F 3/1423 |
| 9,462,054 B2 | 10/2016 | Poletto et al. | |
| 9,787,799 B2 | 10/2017 | Grue et al. | |
| 9,870,802 B2 * | 1/2018 | Carson | G11B 27/031 |
| 9,967,514 B2 * | 5/2018 | Thompson | H04N 5/782 |
| 10,051,142 B1 * | 8/2018 | Villena | H04N 1/2125 |
| 10,491,963 B1 * | 11/2019 | Waggoner | H04N 19/177 |
| 2002/0051065 A1 | 5/2002 | Takahashi et al. | |
| 2002/0054115 A1 * | 5/2002 | Mack | G06T 11/60 |
| | | | 715/765 |
| 2002/0172421 A1 | 11/2002 | Kondo et al. | |
| 2003/0020749 A1 | 1/2003 | Abu-Hakima et al. | |
| 2003/0076322 A1 | 4/2003 | Ouzts et al. | |
| 2003/0218682 A1 | 11/2003 | Lim et al. | |
| 2004/0003117 A1 | 1/2004 | McCoy et al. | |
| 2004/0109063 A1 | 6/2004 | Kusaka et al. | |
| 2004/0133924 A1 * | 7/2004 | Wilkins | G06F 17/30244 |
| | | | 725/135 |
| 2004/0175764 A1 | 9/2004 | Nishiyama et al. | |
| 2005/0052685 A1 | 3/2005 | Herf et al. | |
| 2005/0097445 A1 * | 5/2005 | Day | H04L 12/14 |
| | | | 715/255 |
| 2005/0177796 A1 * | 8/2005 | Takahashi | G06F 3/0486 |
| | | | 715/769 |
| 2006/0037053 A1 * | 2/2006 | McDowell | H04N 7/18 |
| | | | 725/80 |
| 2006/0055944 A1 | 3/2006 | Minakuti et al. | |
| 2006/0114820 A1 | 6/2006 | Hunt et al. | |
| 2006/0152600 A1 | 7/2006 | Hamada et al. | |
| 2006/0173974 A1 | 8/2006 | Tang | |
| 2006/0176305 A1 | 8/2006 | Arcas et al. | |
| 2006/0193012 A1 * | 8/2006 | Wilkins | H04N 1/32101 |
| | | | 358/452 |
| 2006/0242163 A1 | 10/2006 | Miller et al. | |
| 2006/0282788 A1 * | 12/2006 | Paalasmaa | G06F 17/30274 |
| | | | 715/764 |
| 2007/0047650 A1 * | 3/2007 | Vilei | H04N 19/172 |
| | | | 375/240.16 |
| 2007/0133042 A1 * | 6/2007 | Park | H04N 1/00278 |
| | | | 358/1.15 |
| 2007/0156434 A1 * | 7/2007 | Martin | G06F 16/51 |
| | | | 705/1.1 |
| 2007/0253628 A1 | 11/2007 | Brett et al. | |
| 2007/0274563 A1 * | 11/2007 | Jung | H04N 1/00352 |
| | | | 382/103 |
| 2007/0277202 A1 | 11/2007 | Lin et al. | |
| 2007/0294333 A1 | 12/2007 | Yang et al. | |
| 2008/0005669 A1 * | 1/2008 | Eilertsen | G11B 27/034 |
| | | | 715/210 |
| 2008/0025642 A1 * | 1/2008 | Kim | G06T 3/40 |
| | | | 382/298 |
| 2008/0189625 A1 | 8/2008 | Zuta et al. | |
| 2008/0267494 A1 * | 10/2008 | Cohen | G06T 3/4007 |
| | | | 382/166 |
| 2009/0006978 A1 * | 1/2009 | Swift | G09G 5/005 |
| | | | 715/748 |
| 2009/0049408 A1 | 2/2009 | Naaman et al. | |
| 2009/0070675 A1 * | 3/2009 | Li | G06Q 20/12 |
| | | | 715/716 |
| 2009/0089448 A1 | 4/2009 | Sze et al. | |
| 2009/0183060 A1 | 7/2009 | Heller et al. | |
| 2009/0187857 A1 | 7/2009 | Tanaka et al. | |
| 2009/0284611 A1 | 11/2009 | Wood et al. | |
| 2010/0037137 A1 * | 2/2010 | Satou | G06F 3/0482 |
| | | | 715/708 |
| 2010/0082818 A1 | 4/2010 | Paul et al. | |
| 2011/0010629 A1 * | 1/2011 | Castro | G06F 3/1462 |
| | | | 715/732 |
| 2011/0125755 A1 | 5/2011 | Kaila et al. | |
| 2011/0128150 A1 * | 6/2011 | Kanga | G08B 13/19669 |
| | | | 340/541 |
| 2011/0157609 A1 * | 6/2011 | Brady | G06T 11/60 |
| | | | 358/1.6 |
| 2011/0183278 A1 | 7/2011 | Belasse et al. | |
| 2011/0197123 A1 * | 8/2011 | Caine | G06F 3/1454 |
| | | | 715/234 |
| 2011/0200270 A1 | 8/2011 | Kameyama | G06T 1/00 |
| | | | 382/260 |
| 2011/0206342 A1 * | 8/2011 | Thompson | H04N 5/782 |
| | | | 386/200 |
| 2011/0264768 A1 | 10/2011 | Walker et al. | |
| 2011/0269437 A1 | 11/2011 | Marusi et al. | |
| 2011/0302482 A1 * | 12/2011 | Warnock | G06K 9/00469 |
| | | | 715/201 |
| 2012/0001935 A1 * | 1/2012 | Cok | G06T 11/60 |
| | | | 345/619 |
| 2012/0011568 A1 | 1/2012 | Tahan et al. | |

(56) References Cited

U.S. PATENT DOCUMENTS

| | | | |
|---|---|---|---|
| 2012/0102431 A1* | 4/2012 | Krolczyk | G06Q 10/00 715/790 |
| 2012/0158713 A1 | 6/2012 | Jin et al. | |
| 2012/0209815 A1* | 8/2012 | Carson | G11B 27/031 707/661 |
| 2012/0210217 A1* | 8/2012 | Abbas | G11B 27/031 715/716 |
| 2012/0323868 A1 | 12/2012 | Robbin et al. | |
| 2012/0324397 A1* | 12/2012 | Patz | G06F 19/321 715/800 |
| 2012/0331371 A1 | 12/2012 | Larson et al. | |
| 2013/0064439 A1* | 3/2013 | Khurd | G06K 9/6226 382/131 |
| 2013/0080974 A1* | 3/2013 | Suzuki | G06F 3/013 715/811 |
| 2013/0111368 A1 | 5/2013 | Laughlin | |
| 2013/0159936 A1 | 6/2013 | Yamaguchi et al. | |
| 2013/0187946 A1 | 7/2013 | Pan et al. | |
| 2013/0212067 A1 | 8/2013 | Piasecki et al. | |
| 2013/0239003 A1* | 9/2013 | Usenko | G06F 3/0488 715/733 |
| 2013/0290862 A1* | 10/2013 | Chand | G06F 17/30867 715/745 |
| 2014/0040811 A1* | 2/2014 | Brahmanapalli | G06F 3/0486 715/781 |
| 2014/0053206 A1 | 2/2014 | Shoykher et al. | |
| 2014/0068689 A1 | 3/2014 | Sirpal et al. | |
| 2014/0074759 A1* | 3/2014 | Lewis | G06F 17/30849 706/12 |
| 2014/0111516 A1* | 4/2014 | Hall | G06T 11/60 345/428 |
| 2014/0140400 A1* | 5/2014 | George | H04N 19/52 375/240.12 |
| 2014/0189487 A1* | 7/2014 | Kwan | G06F 17/30905 715/234 |
| 2014/0189539 A1* | 7/2014 | St. Clair | G06F 3/048 715/753 |
| 2014/0209326 A1 | 7/2014 | Delange et al. | |
| 2014/0282099 A1* | 9/2014 | Bronder | G06F 3/048 715/753 |
| 2014/0359482 A1* | 12/2014 | Sinn | G06F 3/048 715/753 |
| 2014/0365501 A1 | 12/2014 | Ueno et al. | |
| 2015/0039601 A1* | 2/2015 | Harrang | G06F 17/30867 707/727 |
| 2015/0070582 A1* | 3/2015 | Jung | H04N 9/7921 348/441 |
| 2015/0145889 A1* | 5/2015 | Hanai | H04N 5/2621 345/633 |
| 2015/0178265 A1* | 6/2015 | Anderson | G06F 16/951 704/9 |
| 2015/0201001 A1 | 7/2015 | Cabanillas et al. | |
| 2015/0244794 A1 | 8/2015 | Poletto et al. | |
| 2015/0244833 A1 | 8/2015 | Grue et al. | |
| 2015/0254692 A1* | 9/2015 | Xu | G06Q 30/02 705/7.33 |
| 2017/0123982 A1 | 5/2017 | Haven et al. | |
| 2017/0139824 A1* | 5/2017 | Dragoljevic | G06F 12/0261 |
| 2017/0324807 A1* | 11/2017 | Gu | H04W 4/18 |
| 2017/0366644 A1 | 12/2017 | Grue et al. | |
| 2018/0007323 A1* | 1/2018 | Botusescu | H04N 5/783 |
| 2018/0032259 A1 | 2/2018 | Yook et al. | |
| 2019/0005048 A1* | 1/2019 | Crivello | G06F 16/44 |

FOREIGN PATENT DOCUMENTS

| | | |
|---|---|---|
| JP | 2009531873 A | 9/2009 |
| JP | 2012008643 A | 1/2012 |
| JP | 2012069009 A | 4/2012 |
| WO | WO-0169585 A1 | 9/2001 |
| WO | WO-02082799 A2 | 10/2002 |
| WO | WO-2013177769 A1 | 12/2013 |

OTHER PUBLICATIONS

Brivio P., et al., "PileBars: Scalable Dynamic Thumbnail Bars," The 13rd International Symposium on Virtual Reality, Archaeology and Cultural Heritage VAST, 2012, 8 pages.

Communication under rule 71(3) EPC Intention to Grant for European Application No. 14827975.5 dated May 18, 2020, 7 pages.

Communication under Rule 71(3) EPC of intention to grant for European Application No. 14827975.5 dated Apr. 23, 2020, 7 pages.

European Summons to Attend Oral Proceedings Pursuant to Rule 115(1) EPC for EP Application No. 14827975.5 dated Oct. 28, 2019, 8 pages.

Examination Report for Australian Application No. 2017232144 dated Sep. 14, 2018, 7 pages.

Examination Report for EP Application No. 14827975.5 dated Feb. 20, 2019, 20 pages.

International Search Report and Written Opinion for PCT Application No. PCT/US14/72005 dated Mar. 31, 2015, 14 pages.

Jiang Z., et al., "Web Prefetching in a Mobile Environment," IEEE Personal Communications, IEEE Communications Society, vol. 5 (5), Oct. 1, 1998, pp. 25-34.

Lin C., et al., "Fast Browsing of Large-scale Images Using Server Prefetching and Client Caching Techniques," Located via SPIE http://proceedings.spiedigitallibrary.org/proceeding.aspx?articleid= 905231, Jul. 18, 1999, 12 pages.

Ma W.Y., et al., "Framework for Adaptive Content Delivery in Heterogeneous Network Environments," Proceedings of SPIE, SPIE—International Society for Optical Engineering, vol. 3969, DOI:10.1117/12.373537, ISSN 0277-786X, ISBN 978-1-62841-213-0, XP002374871, Jan. 24, 2000, pp. 86-100.

Moshfeghi M., et al., "Efficient image browsing with JPEG2000 internet protocol," located via SPIE—http://proceedings.spiedigitallibrary.org/proceeding.aspx?articleid=841364, Apr. 19, 2004, 12 pages.

Non-Final Office Action from U.S. Appl. No. 16/193,157, dated Jun. 25, 2020, 28 pages.

Notice of Allowance from U.S. Appl. No. 15/690,126, dated Oct. 21, 2019, 5 pages.

Notice of Allowance for U.S. Appl. No. 14/247,436 dated May 25, 2017, 5 pages.

Notice of Allowance for U.S. Appl. No. 14/927,241 dated Oct. 29, 2018, 11 pages.

Notice of Allowance from U.S. Appl. No. 15/690,126, dated May 24, 2019, 8 pages.

Notice of Allowance from U.S. Appl. No. 15/690,126, dated Feb. 6, 2020, 2 pages.

Notice of Decision to Grant of Japanese Application No. 2018-191152 dated Mar. 9, 2020, 6 pages.

Notice of Reasons for Refusal of Japanese Application No. 2018-191152 dated Nov. 11, 2019, 9 pages.

Office Action for U.S. Appl. No. 14/247,436 dated Mar. 31, 2016, 16 pages.

Office Action for U.S. Appl. No. 14/247,436 dated Sep. 30, 2016, 22 pages.

Office Action for U.S. Appl. No. 14/927,241 dated Apr. 6, 2018, 16 pages.

Plant W., et al., "Visualisation and Browsing of Image Databases," Located via SpringerLink—https://link.springer.com/chapter/10.1007%2F978-3-642-19551-8_1, 2011, pp. 3-57.

"The Layered Look: Better Responsive Images Using Multiple Backgrounds," Jun. 26, 2013, Wayback Machine, retrieved from https://web.archive.org/web/20131022160602/http://css-tricks.com/the-layered-look/ on Oct. 27, 2018, 27 pages.

* cited by examiner

|     |     | # of TIMES VIEWED | # of TIMES SHARED | # of SHARE REQUESTS |
|-----|-----|-------------------|-------------------|---------------------|
| 702 | IMAGE #1 | 1,000 | 50 | 35 |
| 704 | IMAGE #2 | 5,000 | 115 | 75 |
| 706 | IMAGE #3 | 25 | 20 | 10 |
| 708 | IMAGE #4 | 300 | 100 | 60 |
| 710 | IMAGE #5 | 10,000 | 300 | 250 |
| 712 | IMAGE #6 | 475 | 15 | 5 |
| 714 | IMAGE #7 | 3 | 2 | 1 |
| 716 | IMAGE #8 | 6,500 | 500 | 80 |

FIG. 7

SYSTEMS AND METHODS FOR SELECTING CONTENT ITEMS TO STORE AND PRESENT LOCALLY ON A USER DEVICE

CROSS-REFERENCE TO RELATED PROVISIONAL APPLICATION

This application claims the benefit of U.S. Provisional Patent Application No. 61/945,808, filed on Feb. 27, 2014, entitled "SYSTEMS AND METHODS FOR SELECTING CONTENT ITEMS TO STORE AND PRESENT LOCALLY ON A USER DEVICE," the disclosure of which is incorporated herein by reference in its entirety.

FIELD OF THE INVENTION

Various embodiments generally relate to selecting content items to store and present locally on a user device.

BACKGROUND

Social media networks and content management systems that run resident applications on user devices are increasingly becoming programs that individuals interface with daily and habitually. Users of these applications may interface with the plethora of content items, such as photographs, that may be stored thereon. However, the typical social media application, for instance, has numerous drawbacks and limitations that the user typically experiences, but nonetheless may be obligated to deal with.

While the number of content items capable of being stored on social media networks and/or content management systems may be large, the amount of content items that may be viewed upon request may be limited. These limitations may be based on the network conditions between the user's user device and the server hosting the social media network and/or content management system, the local storage space on the user device and/or user account, and/or various other network or device conditions. For example, a user may access their user account on a content management system, and may only be able to view certain images that may have successfully been sent to their device while other images may be "grayed-out" or blank. This may be because the ordering in which images are sent may be random or substantially random. The server, typically, does not account for user preferences and/or device conditions when choosing or selecting which images to send. This may be a tremendous disadvantage felt by almost all individuals at some point because they may be trying to view or find a specific image or content item within their or another individuals account, but be forced to wait to view the image or content item until it loads on their device.

Thus, it would be beneficial for there to be systems and methods that allow images and/or content items to be dynamically selected and sent to a user's user device based on various network and device conditions.

SUMMARY

Systems, methods, and non-transitory computer readable media for dynamically selecting and sending images to a user device based on various network and device conditions may be provided. Such systems may include one or more processors, a display screen, communications circuitry, and memory including instructions.

Such methods may include generating a listing of images stored within a user account on a content management system. For example, all images and/or videos that a user may have stored within their user account may be listed. A selection probability value may be assigned to each image from the listing based on one or more factors. The selection probability value may correspond to a likelihood of use by the user of one or more of the images from the listing. For example, images that have been recently viewed by the user may be assigned a higher selection probability value than images that have not been viewed in a long period of time (e.g., over one year). In some embodiments, an available capacity level of a user device may be determined. Images may be dynamically selected from the listing to be sent to the user device based on each image's assigned selection probability value as well as the determined available capacity level. The dynamically selected images may then be ranked in order of priority for sending, and sent to the user device based on the order until the available capacity level has been met.

In some embodiments, the one or more factors for which the selection probability values are assigned may correspond to any images that have been recently viewed or added to a same collection as any images from the listing, any images added to the user account, a shared virtual space created by the user or to which the user belongs, and/or a notification sent to the user. For example, images recently added to a shared virtual space; or room, that the user may be a member of, may receive a higher selection probability value than an image which was not added to the shared virtual space. In some embodiments, the shared virtual space may be any communications space created by the user and/or visited by the user, where one or more images may be shared between the at least two users.

In some embodiments, the aforementioned generating, assigning, determining, selecting, ranking, and sending may be repeated periodically at defined time intervals. For example, the steps may be repeated every few minutes, hours, days, upon launch of an application on the user device, and/or manually by the user. In some embodiments, the steps may be repeated in response to an action occurring. For example, the steps may be repeated in response to one or more images being added to the user account, a selection by the user to view one or more images within the user account, a selection to add one or more images to the user account, and/or an addition of one or more images to a shared virtual space.

Such methods may also include calculating a number of images stored within a user account on a content management system. For example, a user may have one thousand (1,000) images stored within their user account. For each image, a frequency of use may be determined. For example, the amount of times an image has been shared may correspond to the image's frequency of use. A dynamic priority list for sending images to a user device from the content management system may be created. In some embodiments, the dynamic priority list may rank each image by an image's assigned selection probability value. In some embodiments, the dynamic priority list may queue the content management system to send images to the user device in order of each image's rank.

In some embodiments, the frequency of use may correspond to an amount of times an image has been shared or requested to be shared, the amount of times an image has been viewed, and/or a number of contacts of the user account having a particular image stored within their own user account. For example, if multiple contacts of the user all have the same photograph stored within their user accounts, that image may receive a higher frequency of use than an image that may only be stored within one contact's user account. In some embodiments, an amount of available storage space on the user device may be calculated. A first amount of images, each having a first resolution, may be sent to the user device based on the calculated amount of available storage space and the images' rank within the dynamic priority list. In some embodiments, a level of connectivity between the user device and the content management system may be determined along with calculating the available storage space.

Such methods may still further include determining an amount of available storage space on a user device and sending data to a content management system indicating the determined amount of available storage space. In some embodiments, a first dynamic priority list may be received from the content management system and may include a first plurality of images ranked in a first order based on a first probability value assigned to each image from the first plurality of images. In some embodiments, one or more inputs may be detected that corresponds to one or more images from the first plurality of images, and data corresponding to the detected one or more images may be sent from the user device to the content management system. In response to sending the data, a second dynamic priority list may be downloaded from the content management system to the user device. The second dynamic priority list may include a second plurality of images ranked in a second order based on a second probability value assigned to each image from the second plurality of images.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which:

FIG. 7 shows another illustrative diagram of a listing of images in accordance with various embodiments;

DETAILED DESCRIPTION OF THE DISCLOSURE

Methods, systems, and computer readable media for dynamically selecting and sending images to a user device based on various network and device conditions are provided. By dynamically selecting and sending images to the user device, the user may be able to view, interact, share, and/or store images that are most relevant, important, and/or related to the user and/or the user's current activities.

For purposes of description and simplicity, methods, systems and computer readable media will be described for dynamically selecting and sending images to a user device based on various network and device conditions.

It is noted that the terms "device" and "content management system" are used herein to refer broadly to a wide variety of storage providers and data management service providers, electronic devices and user devices. It is also noted that the term "content item" is user herein to refer broadly to a wide variety of digital data, documents, text content items, audio content items, video content items, portions of content items, and/or other types of data. Content items may also include files, folders or other mechanisms of grouping content items together with different behaviors, such as collections of content items, playlists, albums, etc. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. The term "continuous real-time image" is also used herein broadly, and may correspond to live images captured via one or more image capturing components, continuous images captured, recorded images, or any other type of image that may be captured via an image capturing component, or any combination thereof.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

Figure 1:
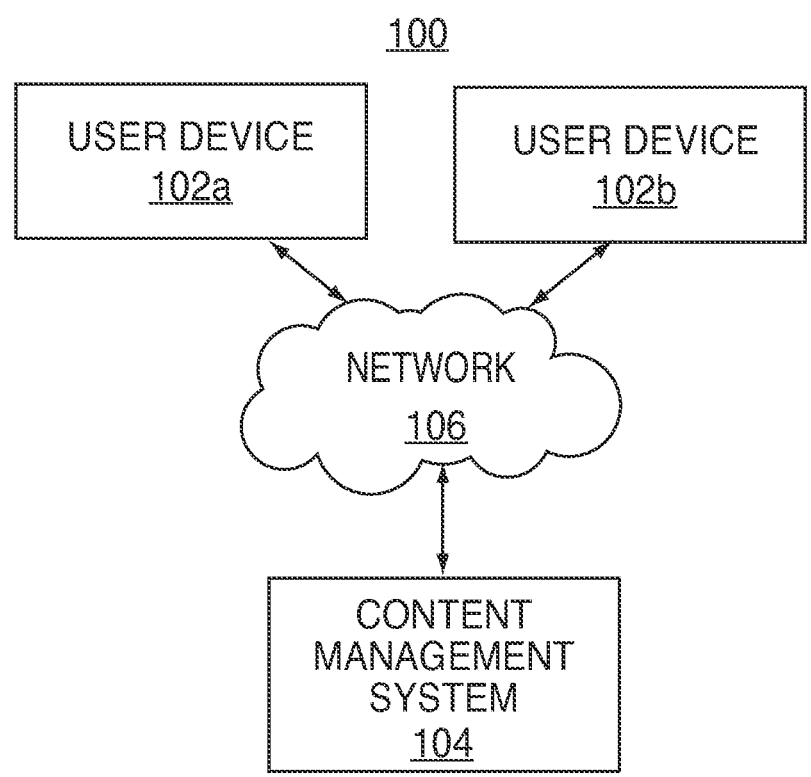
FIG. 1 shows an exemplary system in accordance with various embodiments.

FIG. 1 shows an exemplary system in accordance with various embodiments. System 100 may include user devices 102a and 102b, which may communicate with content management system 104 across network 106. Persons of ordinary skill in the art will recognize that although only two user devices are shown within system 100, any number of user devices may interact with content management system 104 and/or network 106, and the aforementioned illustration is merely exemplary.

Network 106 may support any number of protocols, including, but not limited to, Transfer Control Protocol and Internet Protocol ("TCP/IP"), Hypertext Transfer Protocol ("HTTP"), and/or wireless application protocol ("WAP"). For example, user device 102a and user device 102b (collectively 102) may communicate with content management system 104 using TCP/IP, and, at a higher level, use a web browser to communicate with a web server at content management system 104 using HTTP.

A variety of user devices 102 may communicate with content management system 104, including, but not limited to, desktop computers, mobile computers, mobile communication devices (e.g., mobile phones, smart phones, tablets), televisions, set-top boxes, and/or any other network enabled device. Various types of user devices may include, but are not limited to, smart phones, mobile phones, tablet computers, personal digital assistants (PDAs), laptop computers, digital music players, and/or any other type of user device capable of including a touch-sensing display interface. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive and detect gestures. Multi-touch panels, for example, may include capacitive sensing mediums having a one or more of row traces and/or driving line traces, and one or more column traces and/or sensing lines. Although multi-touch panels are described herein as one example for touch-sensing display interface, persons of ordinary skill in the art will recognize that any touch-sensing display interface may be used. Furthermore, various types of user devices may, in some embodiments, include one or more image capturing components. For example, user devices 102 may include a front-facing camera and/or a rear facing camera.

Content management system 100 may allow a user with an authenticated account to store content, as well as perform management tasks, such as retrieve, modify, browse, synchronize, and/or share content with other accounts. In some embodiments, a counter-part user interface (e.g., stand-alone application, client application, etc.) on user devices 102 may be implemented using a content management interface module to allow a user to perform functions offered by modules of content management system 104. A more detailed description of system 100 is presented below, with reference to FIG. 12.

Figure 2:
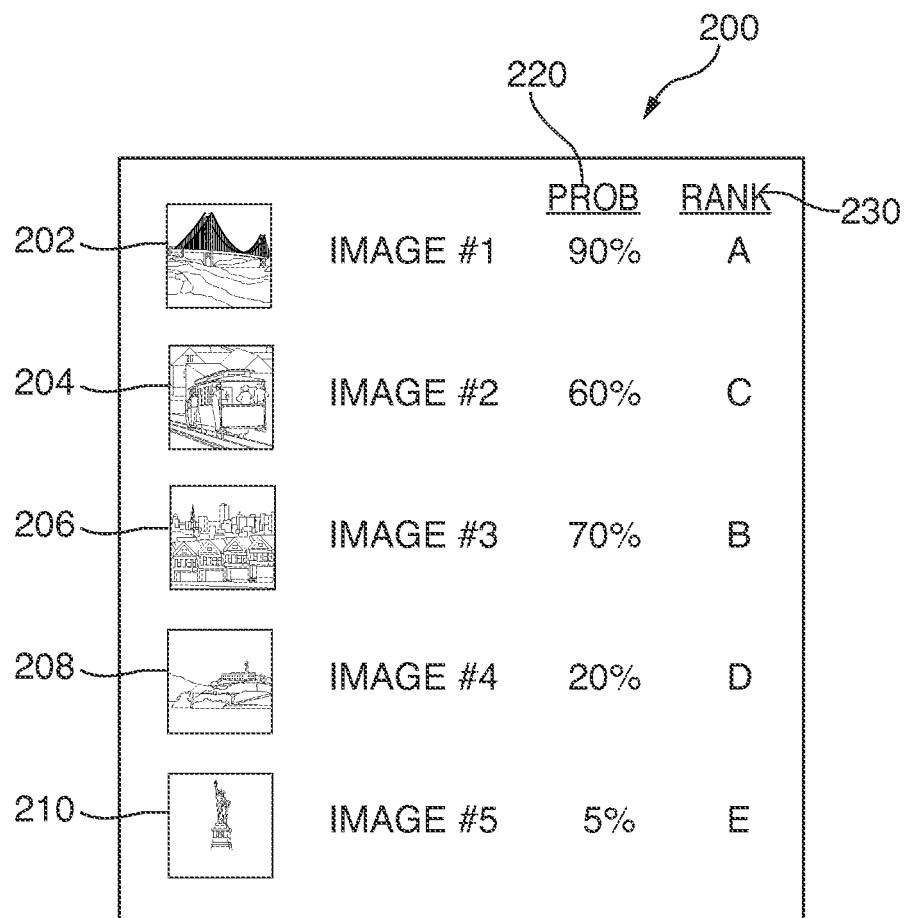
FIG. 2 shows an illustrative diagram of a listing of images in accordance with various embodiments.

FIG. 2 shows an illustrative diagram of a listing of images in accordance with various embodiments. In some embodiments, listing 200 may correspond to a listing of images stored within a user account on a content management system (e.g., content management system 100 of FIG. 1). Listing 200 may also correspond to a listing of images stored on a user device (e.g., client device 102), a user's account on a social media network, or a contact of the user.

Listing 200 may display images 202, 204, 206, 206, 208, and 210. Although only five (5) images are included within the presented listing, persons of ordinary skill in the art will recognize that any number of images may be included within the listing, and the use of five images is merely exemplary. In some embodiments, each image may include a title or identification tag. For example, image 202 may have title "IMAGE #1," image 204 may have title "IMAGE #2," image 206 may have title "IMAGE #3," image 208 may have title "IMAGE #4," and image 210 may have title "IMAGE #5." In some embodiments, the use of a title or an identification tag may depend on where listing 200 may be presented. For example, if listing 200 is displayed within a user interface, each image may include its associated title. This may aid the user in recognizing and/or viewing certain images within the listing. In some embodiments, listing 200 may correspond to a listing which may not be displayed to a user and/or may not be presented within a user interface. In this scenario, each image may have an identification tag presented or linked to that image instead of, or in addition to, the title. For example, the identification tag may be any 8, 16, or 64 bit alphanumeric string that may describe various features of the respective image associated therewith.

In some embodiments, each image from within listing 200 may have a selection probability value associated with that image. The selection probability value may highlight a particular image's likelihood of being viewed, selected, shared, requested to be shared, interacted with, or to have any other action taken to it, or any combination thereof. For example, images that a user has recently viewed may have a higher selection probability value than images that have not been viewed in a long time (e.g., multiple years). Persons of ordinary skill in the art will recognize that any action or combination of actions performed to an image, performed with an image, taken upon an image, and/or associated with an image may be used in any suitable manner to determine an image's selection probability value. Furthermore, in some embodiments, each image's selection probability value may be dynamic. For example, an image that has not been shared in over a year may have a lower selection probability value than an image that was viewed less than one week earlier. In response to the user viewing the image last viewed a year ago, that image may now be assigned a higher selection probability value than the image viewed earlier that week.

In some embodiments, each image may have their respective selection probability value stored and/or presented in selection probability value column 220. For example, image 202 may have a selection probability value of 90%, whereas images 204, 206, 208, and 210 may each have a selection probability value of 60%, 70%, 20%, and 5%, respectively. Persons of ordinary skill in the art will recognize that any image may be assigned any selection probability value, and the aforementioned selection probability values are merely exemplary. In some embodiments, column 220 may store and/or present the selection probability values in terms of percentage, rank, frequency, collection, or using any other value, or any other suitable recognition means capable of signifying an image's probability of being selected.

Depending on a particular image's selection probability value, a different ordering or rank may also be assigned to that image, and may be stored and/or presented in column 230. In some embodiments, an image's rank may correspond to an order that the image may be sent, downloaded, and/or uploaded. For example, image 202 may have a selection probability value of 90% and therefore may be assigned rank "A". An image having a rank of "A" may be sent, uploaded, and/or downloaded prior to other images because of its higher selection probability value. As another example, image 210 may have a selection probability value of 5% and may be assigned rank "E". An image having a rank of "E" may be sent, downloaded, and/or uploaded later than images having a rank of A, B, C, or D because those images may have a higher selection probability value. In some embodiments, the rank of an image may correspond to a collection of images that may be sent, downloaded, and/or uploaded. For example, images 202 and 206, which respectively have selection probability values of 90% and 70%, may, in some embodiments, be sent in a same collection and therefore may both have a rank of "A". Thus, the rankings presented here are merely illustrative, and persons of ordinary skill in the art will recognize that any ranking order may be used, and each rank may include any number of images.

Figure 3:
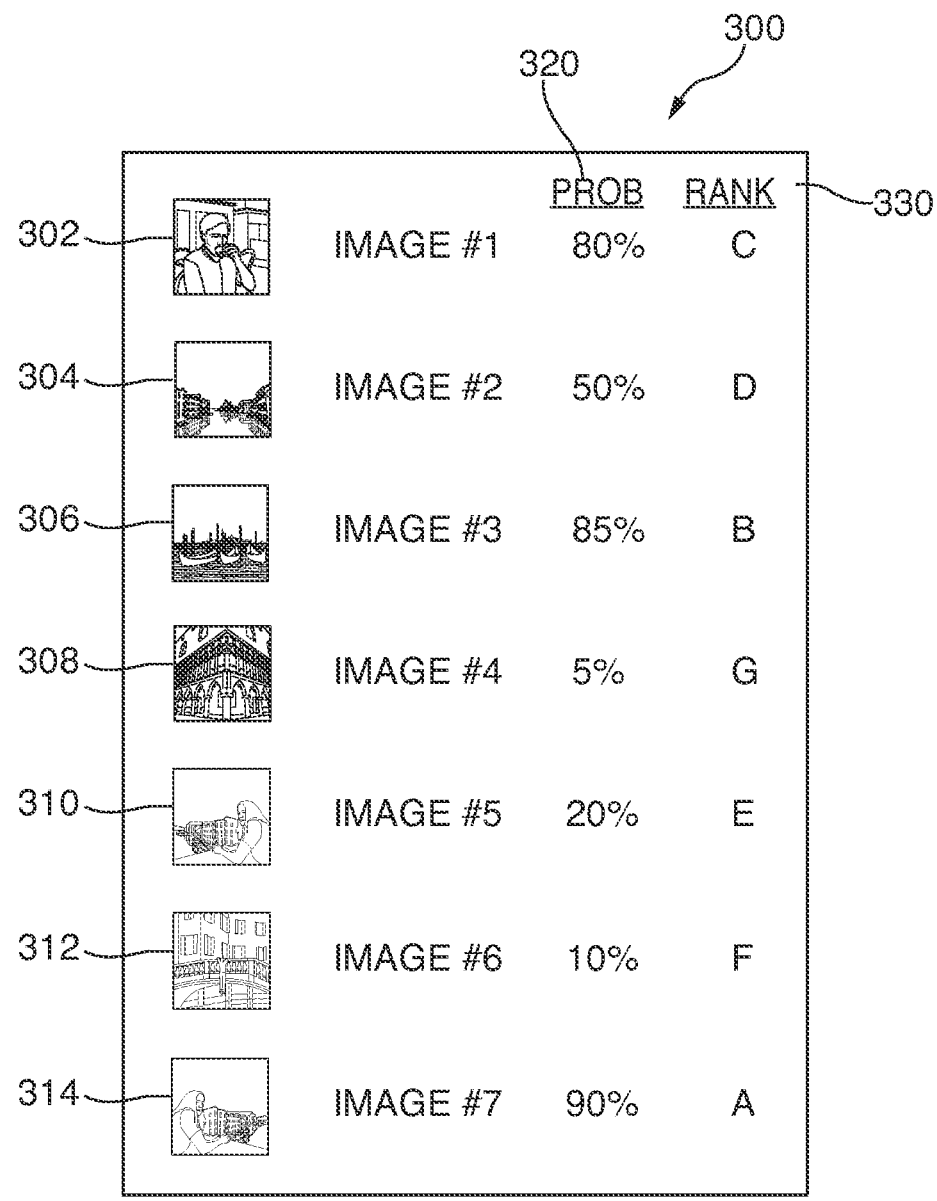
FIG. 3 shows another illustrative diagram of a listing of images in accordance with various embodiments.

FIG. 3 shows another illustrative diagram of a listing of images in accordance with various embodiments. In some embodiments, listing 300 may be substantially similar to listing 200 of FIG. 2, and the previous description of the latter may apply to the former. In some embodiments, listing 300 may include additional images, such as images 312 and 314. In some embodiments, images 302, 304, 306, 308, and 310 may be substantially similar to images 202, 204, 206, 208, and 210 of FIG. 2, and the previous description of the latter may also apply.

In some embodiments, listing 300 may correspond to a new version of listing 200 in response to one or more user actions being performed. For example, a user may add, or attempt to add, images 312 and 314 to a user account on a content management system. In response to adding the images, each image's assigned probability value and/or rank may change. Thus, listing 300 may be dynamic, and each images selection probability value and/or rank may dynamically change depending on whether or not an action has occurred, and/or what type of action has occurred. For example, image 202 may not have been viewed in a week, and thus in response to adding images 312 and 314, image 202 may have its selection probability value decrease slightly due to the lack of recent viewing.

As previously mentioned, each image from listing 300 may have a selection probability value and a rank assigned to it. For example, images 302, 304, 306, 308, 310, 312, and 314 may respectively have selection probability values of 80%, 50%, 85%, 5%, 20%, 10%, and 90%, which may be listed in column 320. Based on these values, column 330 may list each image's corresponding rank. For example, image 302 may have a selection probability value of 80%, which may correspond to rank "C". In some embodiments, image 302 may be substantially similar to image 202 of FIG. 2, with the exception that image 302 may now have a lower selection probability value (e.g., 80% from 90%) and a lower ranking order (e.g., rank "C" from rank "A"). The changed probability value and rank may be due to an action being performed to one or more images within listing 300. For example, in response to the addition of images 312 and 314, image 302 and/or any other image within listing 300, may be assigned different selection probability values and/or ranks.

As an illustrative example, in response to images 312 and 314 being added to listing 300, each of images 302, 304, 306, 308, and 310 may have their selection probability values change. Initially, images 302, 304, 306, 308, and 310 may have been assigned selection probability values similar to that of images 202, 204, 206, 208, and 210. However, in response to the addition of images 312 and 314, their values may be modified. This may correspond to the fact that within the time period between images 312 and 314 being added, the probability of a user viewing, interacting, and/or performing any action to the images may change, and the new selection probability values may encompass this change.

In some embodiments, in response to the changes to each image's selection probability value from listing 300, their ranking order may also change. For example, image 302 may now have a selection probability value of 80%, which may correspond to rank "C". This may be due to the fact that image 306 and 314 each have a higher selection probability value than image 302 (e.g., 85% and 90%, respectively). Images 306 and 314 may then have ranks of "B" and "A" respectively, as they have a higher selection probability value and therefore may be capable of sending prior to image 302. Persons of ordinary skill in the art will recognize that any selection probability value and any ranking order may be used and/or assigned to any image included within listing 300, and the aforementioned values are merely exemplary.

Figure 4:
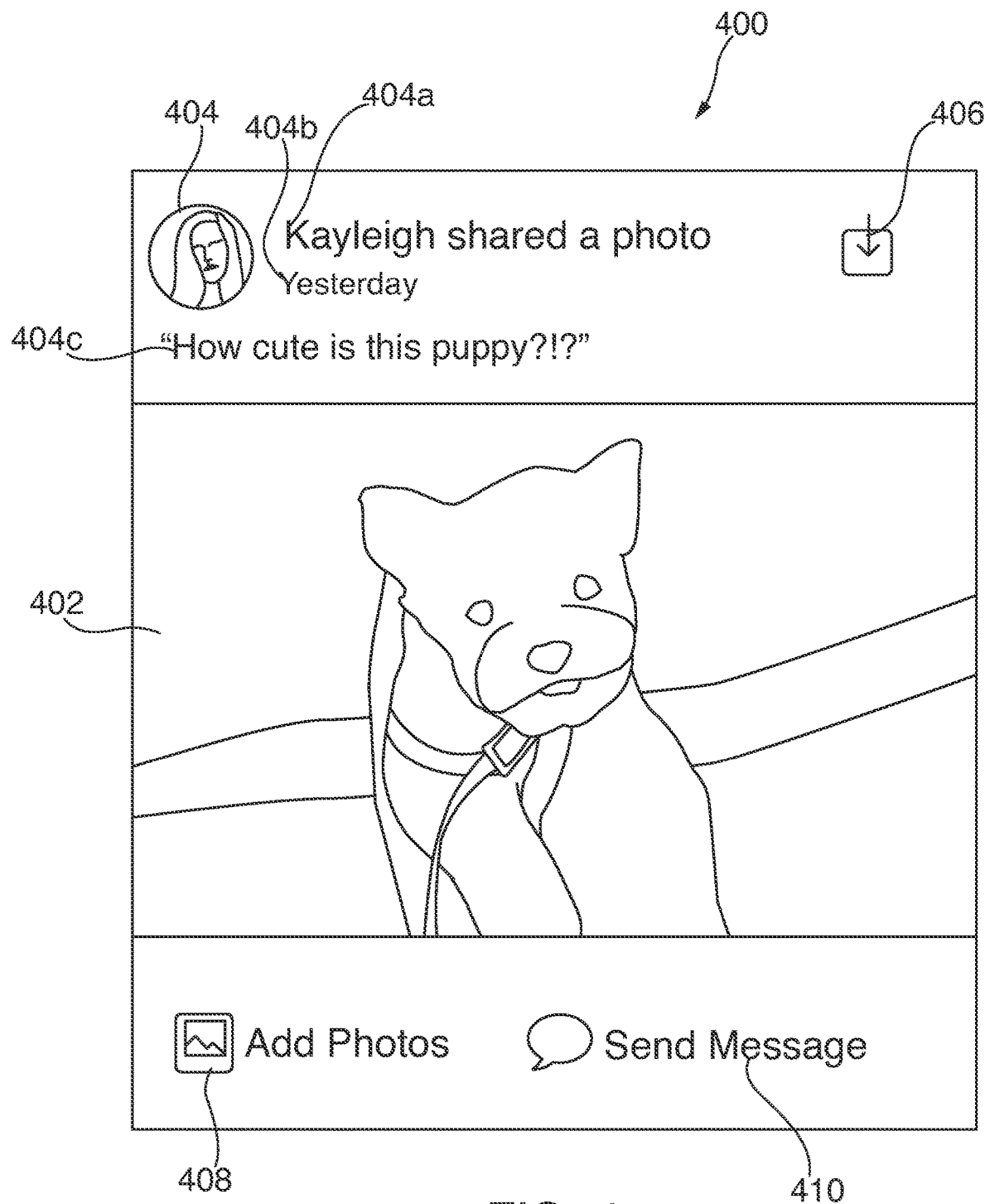
FIG. 4 shows an illustrative diagram of a user interface in accordance with various embodiments.

FIG. 4 shows an illustrative diagram of a user interface in accordance with various embodiments. User interface 400 may be any user interface displayed within a display screen on a user device (e.g., device 102). In some embodiments, user interface 400 may display image 402 in response to an attempt to share the image with one or more contacts, one or more social media networks, and/or a content management system. In some embodiments, user interface 400 may correspond to a shared virtual space that the user belongs to. For example, the user may belong to an image sharing stream or room with one or more contacts, and may attempt to share image 402 within that shared space.

User interface 400 may, in some embodiments, include user icon 404. User icon 404 may display a picture, icon, moving image, static image, or any other representation of a user, which may be used as a form of visual identification for a user within user interface 400. For example, user interface 400 may correspond to a shared virtual space with a large number of users, and user icon 404 may help in letting other users recognize which user may be adding, or attempting to add, an image, such as image 402 to the shared virtual space. In some embodiments, the user icon may be assigned to the user by other users. For example, user icon 404 may correspond to an image stored on a user device corresponding to a particular contact. In some embodiments, the user icon may be self-assigned (e.g., the contact may decide their icon), and/or the user icon may be randomly or selectively assigned by a content management system. In some embodiments, no user icon may be present, or a static image may be displayed until a user icon has been selected/assigned.

In some embodiments, user interface 400 may include action 404a, time of action 404b, and/or comment 404c. Action 404a may describe to anyone viewing user interface 400 what the intended action of the user corresponding to user icon 404 may be. For example, action 404a may display "Kayleigh shared a photo," indicating that the user may have shared image 402 within user interface 400. Time of action 404b may, in some embodiments, correspond to a general time when action 404a occurred. For example, time of action 404b may indicate that action 404a occurred at a specific time (e.g., hour, minute), a specific date (e.g., day/month/year), and/or a general time period (e.g., yesterday, last week, a month ago, etc.). Comment 404c may, in some embodiments, correspond to a comment that the user may have provided along with the image. For example, comment 404c may be created by the user and may be linked to image 402. Anytime a user views image 402 within the shared virtual space, that user may be presented with comment 404c as well. However, persons of ordinary skill in the art will recognize that any one of action 404a, time of action 404b, and/or comment 404c may be removed or omitted from user interface 400, and/or any other feature or icon may be included, and the aforementioned is merely exemplary.

In some embodiments, user interface 400 may be presented on a user device in response to a contact sharing image 402 with the user. For example, a contact corresponding to user icon 404 may share image 402 with the user of device 102. In some embodiments, the user may be able to download image 402 to their user device by selecting button 406. Button 406 may be any button operable to either save the shared image and/or re-share image 402 with another contact, another social media network, or a content management system. For example, a user may receive image 402 from a contact and then re-share image 402.

In some embodiments, user interface 400 may correspond to a shared virtual space that the user belongs to. For example, the user may be in a shared virtual space with one or more contacts who may share an image, such as image 402, with the user. In some embodiments, the user may be able to add one or more photos to the shared virtual space by selecting "Add Photos" button 408. In response to selecting button 408, the user may be presented with a listing of images stored on their user device and/or within their user account on the content management system to share within the shared virtual space. For example, in response to receiving image 402, the user may select button 408 and reply by sending another image (e.g., an image of another dog) to that contact who shared image 402.

In some embodiments, user interface 400 may also include "Send Message" button 410. Button 410 may allow the user to send a textual message, an instant message, an email, and/or a chat message to any contact already within a shared virtual space with the user. For example, in response to receiving image 402, the user may select button 410 and send a message back to the contact who sent image 402, commenting on the shared image. In some embodiments, the message may be displayed with or substantially near message 404c, thus creating a virtual chat or textual stream regarding image 402.

Figure 5:
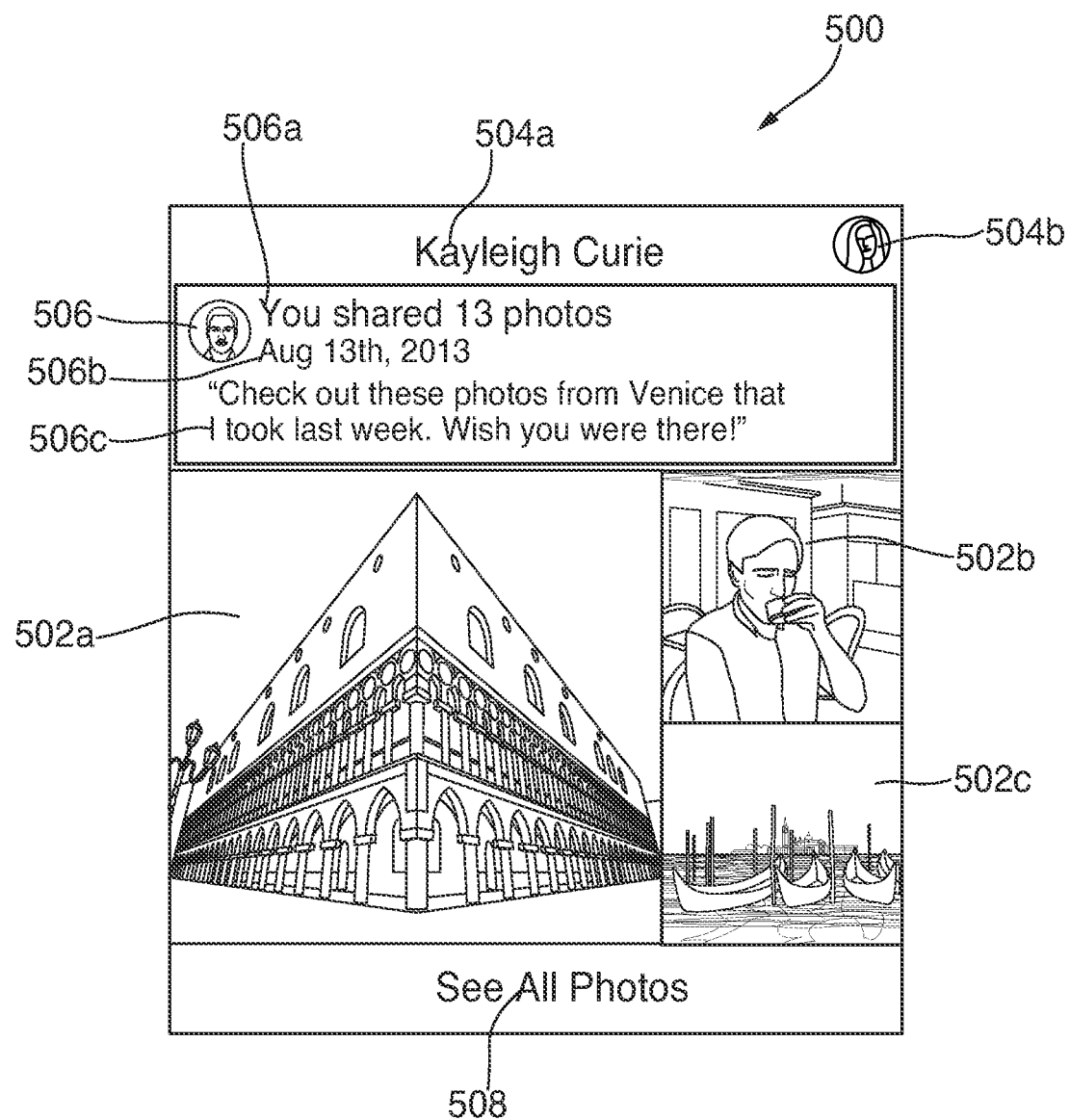
FIG. 5 shows another illustrative diagram of a user interface in accordance with various embodiments.

FIG. 5 shows another illustrative diagram of a user interface in accordance with various embodiments. User interface 500 may include multiple images shared within a shared virtual space. Images 502a, 502b, and 502c may, for example be displayed within user interface 500. In some embodiments, one or more of images 502a, 502b, and 502c may be moveable about the user interface. For example, a user may provide one or more gestures to augment a location of an image. In some embodiments, images displayed within user interface 500 may be manipulated, modified, and/or resized. For example, a user may choose to view each image displayed within user interface 500, or the user may decide to zoom in and display only a single image.

In some embodiments, user interface 500 may be capable of displaying more images and/or different images than images 502a-c. For example, the user may share thirteen (13) images within a shared virtual space. In some embodiments, only images 502a-c may initially be displayed, however the user may be presented with one or more additional images by pressing "See All Photos" button 508. Selecting button 508 may present the user with any number of images which may have previously been shared within the shared virtual space. In some embodiments, pressing button 508 may provide the user with one or more images stored within their user account and/or resident on their local device. For example, a user may select button 508 and be presented with their user device's camera roll. The user may then be able to select one or more images from with their camera roll to share with one or more contacts, one or more social media networks, one or more shared virtual spaces, and/or a contact management system.

In some embodiments, user interface 500 may include contact name 504a and contact icon 504b. For example, user interface 500 may display images 502a-c, which may presented within a shared virtual space between a user and a contact of the user. The contact's name may be displayed in the user interface as contact name 504a. In some embodiments, if the shared virtual space where images 502a-c are displayed corresponds to more than one contact, contact name 504 may display multiple names. In some embodiments, contact icon 504b may correspond to a picture or image of the contact from the shared virtual space. Icon 504b may correspond to any image and may be chosen by the contact, designated by the user, and/or assigned by a content management system hosting the shared virtual space. In some embodiments, contact name 504a and contact icon 504b may be representative of the user instead of a contact of the user.

In some embodiments, user interface 500 may also include user icon 506 corresponding to the user being presented with user interface 500. User icon 506 may correspond to any photograph and/or image chosen by the user to represent the user within the shared virtual space. User interface 500 may also include action 506a, time of action 506b, and/or comment 506c, which may, in some embodiments, be substantially similar to action 404a, time of action 404b, and/or comment 404c of FIG. 4 with the exception that the latter may apply to a contact of the user whereas the former may apply to the user. Persons of ordinary skill in the art will recognize that user icon 506 and action 506a, time of action 506b, and comment 506c may, in some embodiments, apply to a contact of the user, and contact name and icon 504a and 504b may then correspond to the user, and the use of one collection for either the user and/or the contact is merely exemplary.

Figure 6A:
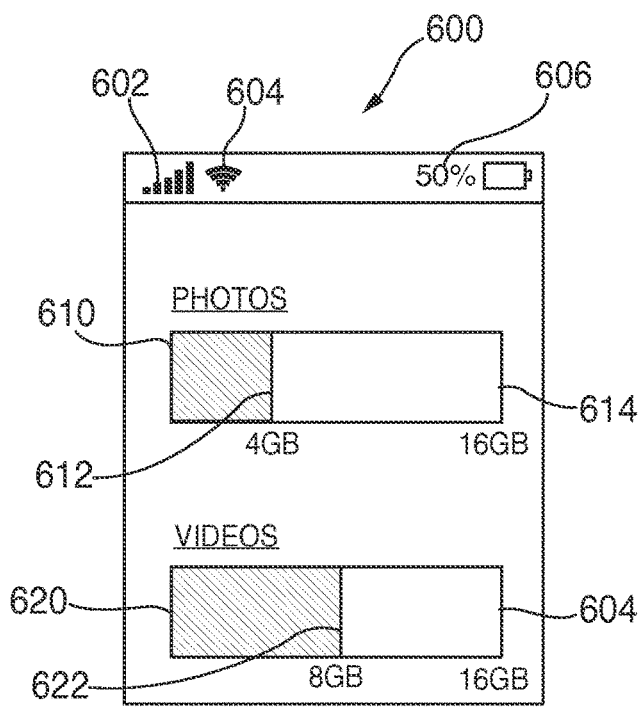
FIG. 6A shows an illustrative diagram of a user interface displaying a user's storage settings in accordance with various embodiments.

FIG. 6A shows an illustrative diagram of a user interface displaying a user's storage settings in accordance with various embodiments. User interface 600 may include network indicator 602, wireless indicator 604, and battery indicator 606. Network indicator 602 may indicate an amount of available network connection. For example, the user may have a cellular data carrier providing cellular network service. Network indicator 602 may indicate how strong or powerful the cellular service may be in particular location at a particular time. Wireless indicator 604 may behave similarly to network indicator 602 with the exception that wireless indicator 604 may indicate an amount of available Wi-Fi signal available. In some embodiments, battery indicator 606 may indicate an amount of available battery charge on the user device. For example, the user device may only have 50% charge remaining, and therefore indicator 606 may display "50%" battery charge. In some embodiments, indicator 606 may indicate a percentage of battery charge remaining, an amount of battery time remaining, an amount of battery used, or any other charge indicator, or any combination thereof. Persons of ordinary skill in the art will recognize that although user interface 600 displays indicators 602, 604, and 606, one or more of these indicators may not be displayed and/or one or more additional indicators may be displayed.

In some embodiments, user interface 600 may indicate an amount of storage space occupied on the user device by various files or content items. For example, user interface 600 may correspond to a settings interface, indicating the various storage levels on the device. In some embodiments, user interface 600 may include photo storage bar 610 and video storage bar 620. Photo storage bar 610 may display an amount of storage space occupied on the user device by photographs. For example, the user may have 4 GB of photographs stored on their user device. Current photo storage value 612 may indicate the amount of storage space occupied by photos on the user device (e.g., 4 GB). Total photo storage value 614 may indicate a total amount of storage space available on the user device for storing photographs (e.g., 16 GB). Video storage bar 620 may display an amount of storage space occupied on the user's user device by videos. For example, the user may have 8 GB of videos stored on their user device. Current video storage value 622 may indicate the current amount of storage space occupied on the user device (e.g., 8 GB) by videos. Total video storage value 624 may indicate a total amount of storage space available on the user device for storing videos (e.g., 16 GB). Persons of ordinary skill in the art will recognize that any amount of storage space may be allotted for any content item, and any amount of storage space may be occupied.

In some embodiments, the total amount of storage space available for all content items may be the same. For example, the user device may have a total amount of available storage of 16 GB. In this scenario, if the device has 4 GB of photographs and 8 GB of videos, then 12 GB of storage space may be taken up. In some embodiments, there may only be one storage bar displaying a total amount of storage available and/or taken up on the device. In some embodiments, each of storage bars 610 and 612 may represent individual storage bars each displaying a total amount of storage space available for a single media type. For example, the user device may have 16 GB of storage space available for photographs and 16 GB of storage space available for videos.

In some embodiments, the amount of storage space available on the user device may be determined using one or more system performance algorithms. For example, the user device's operating systems may include one or more options allowing the user to be presented with a screen substantially similar to user interface 600 that indicates the storage levels of the user device. In some embodiments, the performance algorithm may be performed upon a user's request and/or automatically at predefined time intervals (e.g., daily, monthly, annually, etc.).

Figure 6B:
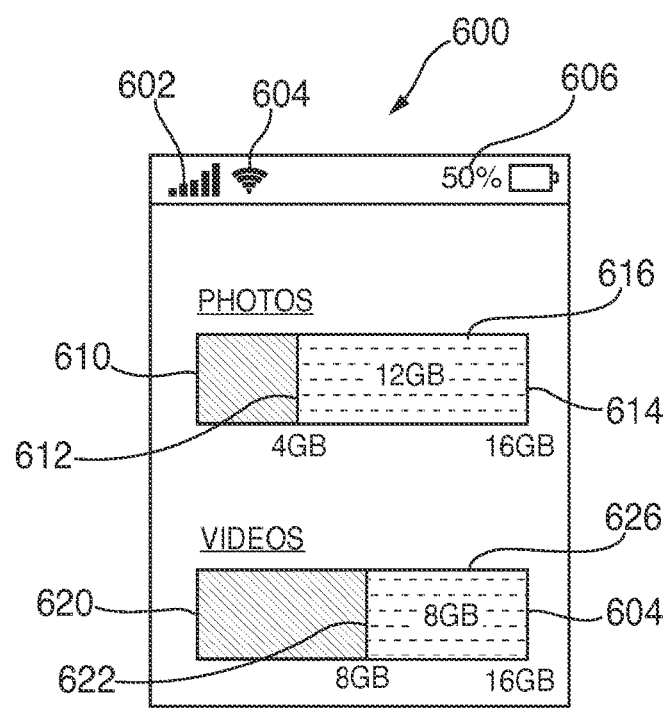
FIG. 6B shows another illustrative diagram of a user interface displaying a user's storage settings in accordance with various embodiments.

FIG. 6B shows another illustrative diagram of a user interface displaying a user's storage settings in accordance with various embodiments. User interface 600 of FIG. 6B may, in some embodiments, be substantially similar to user interface 600 of FIG. 6A, with the exception that the former may display various amounts of data available for download on the user device. In some embodiments, a user may continually download content until the amount of available storage space has been filled. For example, in order to continually maintain a local user experience on a user device while offline, a large amount of content may be downloaded in advance to the user device. The content may continually download and/or may be dynamically changing. For example, based on a probability that an image will be viewed by a user, specific images may download to the user device based on each image's selection probability value. Thus, a user may continually have images stored on their user device that they are most likely to view, that way if connectivity is ever not available, the user may not have to wait until connectivity returns to view their images.

Photo storage bar 610 may also include available storage value 616. For example, the user device may be capable of storing 16 GB of photographs, as indicated by total photo storage value 614. Current photo storage value 612 may indicate only 4 GB of the available 16 GB may be occupied by photographs and current available photo storage value 616 may indicate that a remaining 12 GB may be available. Similarly, current video storage value 626 may indicate that there may be 8 GB of available storage on the user device for videos because there are already 8 GB of videos occupying the 16 GB of total storage space for videos.

In some embodiments, values 616 and 626 may indicate an amount of storage space occupied by content items dynamically sent to the user device from a content management system. For example, a user may have a large quantity of images stored within their user account on a content management system (e.g., content management system 100). Each image stored therein may have a selection probability value assigned to that image based on the probability that the user may view, or attempt to view, that image. For example, images that have recently been added, shared, and/or viewed may be assigned a higher selection probability value than images that have not been viewed in a long period of time (e.g., one or more years).

The user account may continually send images to the user device based on the selection probability values of each image. For example, images having higher selection probability values may be sent prior to images having lower selection probability values. The images may continue to send to the user device until the total photo storage value 614 has been met. In some embodiments, the images sent to the user device may continually change based on any action performed on the images. For example, if one or more images are shared with a contact of the user, those images may be assigned a higher selection probability value and therefore the order of sending the images to the user device may change.

FIG. 7 shows another illustrative diagram of a listing of images in accordance with various embodiments. Listing of images 700 may, in some embodiments, be substantially similar to listing 200 of FIG. 2, with the exception that listing 700 may indicate various parameters associated with each image. In some embodiments, the parameters displayed may include, but are not limited to, the number of times an image has been viewed, and/or the number of times an image has been shared. Each of these parameters may have a corresponding numerical value associated with each image and listed within columns 720, 730, and 740, respectively.

In some embodiments, each image within listing 700 may have a corresponding value listed within column 720 corresponding to a number of times that image has been viewed. For example, image 702 may have been viewed one thousand (1,000) times, whereas image 714 may have been viewed three (3) times. As another example, image 704 may have been viewed five thousand (5,000) times, whereas image 708 may have been viewed three hundred (300) times. The amount of times an image has been viewed may correspond to any viewing of the image by the user, a contact of the user, a contact of the contact of the user, and/or any other individual or collection of individuals who may access and/or obtain the image and view it on their own device.

In some embodiments, each image within listing 700 may have a corresponding value listed within column 730 corresponding to a number of times that image has been shared. For example, image 706 may have been shared by the user twenty (20) times, whereas image 710 may have been shared three hundred (300) times. In some embodiments, the number of times an image has been shared may correspond to any sharing of the image by the user. For example, a user may share any image stored within their user account on a content management system with one or more contacts, one or more social media networks, and/or one or more shared virtual spaces with which the user belongs too. In some embodiments, an image may be stored on the user device and may be shared within any number of contacts by uploading the image to a content management system. For example, a user may capture an image with their user device and upload that image to their user account on a content management system.

In some embodiments, each image within listing 700 may have a corresponding value listed within column 740 corresponding to an amount of times that particular image has been requested to be shared. For example, image 712 may have been requested to be shared five (5) times, whereas image 716 may have been requested to be shared eighty (80) times. In some embodiments, a request to share an image may be received by a user from a contact of the user. For example, a user may have an image of their new child stored within their user account. The image may be requested to be shared with the user's friends and family so that they can each view and/or download a version of the stored image. In some embodiments, the user may receive the request to share an image via an email, a text message, and/or a pop-up notification, or using any other suitable notification, or any combination thereof.

Figure 8:
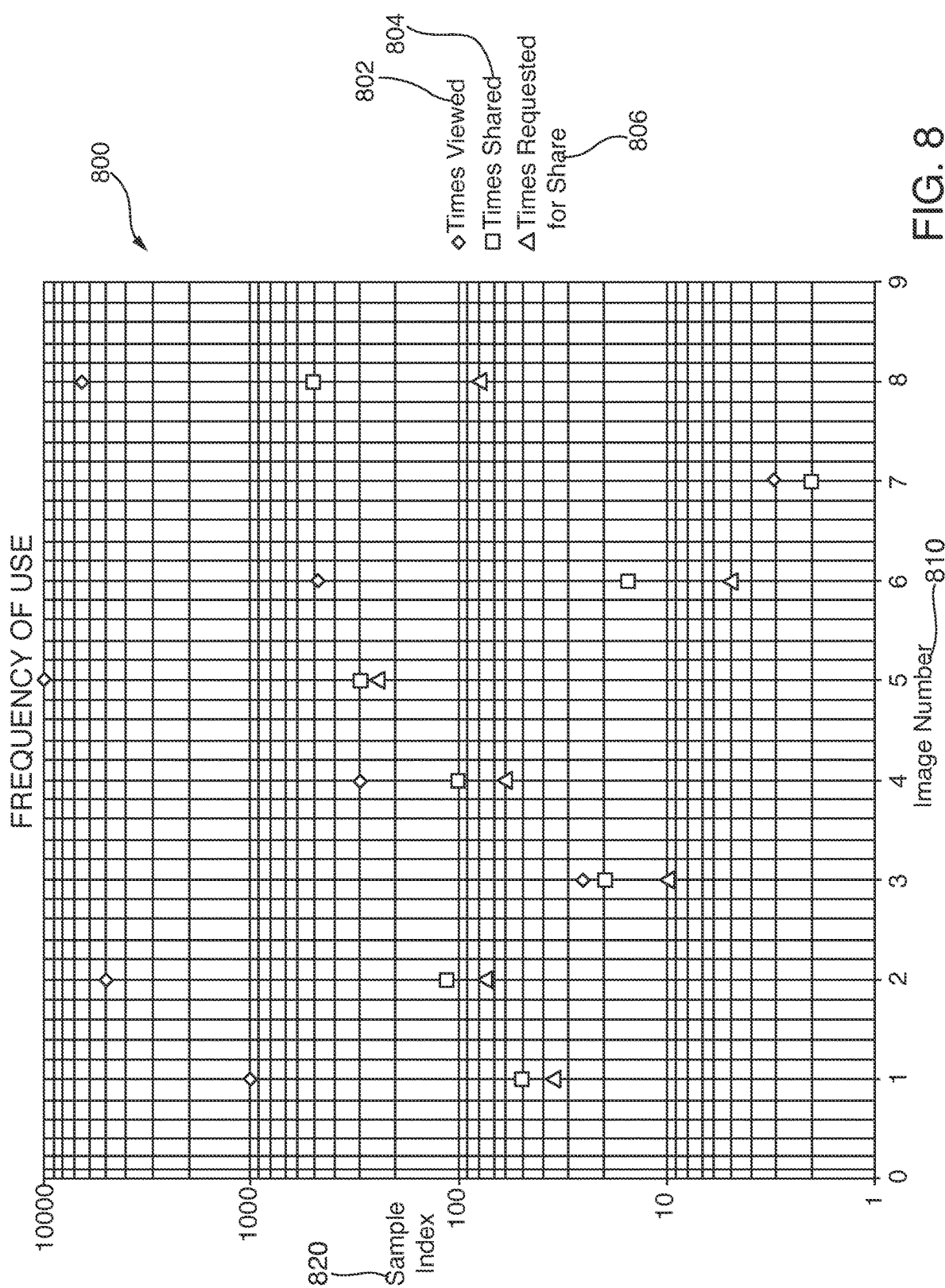
FIG. 8 shows an illustrative graph of a frequency of use for each image within a listing of images in accordance with various embodiments.

FIG. 8 shows an illustrative graph of a frequency of use for each image within a listing of images in accordance with various embodiments. Graph 800 may include data points corresponding to listing of images 700 of FIG. 7. For example, diamond pointed data markers 802 may correspond to column 720, whereas square data markers 804 and triangle data markers 806 may correspond to columns 730 and 740, respectively. Each data marker may correspond to a particular image from listing 700, and may represent the amount of times that image was viewed (e.g., markers 802), shared (e.g., markers 804), and requested to be shared (e.g., markers 806).

Graph 800 may also include first axis 810 corresponding to an image number from listing of images 700 and a second axis 820 corresponding to values of columns 720, 730, and 740. In some embodiments, first axis 810 may be referred to as the x-axis, whereas second axis 820 may be referred to as the y-axis. Persons of ordinary skill in the art will recognize that first axis 810 and second axis 820 may correspond to any axes and may be associated with any coordinate system, and the use of the x- and y-axes is merely exemplary. In some embodiments, second axis 820 may be in units referred to as "SAMPLE INDEX". The use of a sample index as units is merely exemplary, and may indicate that the values of the numbers used on that particular axis can be in arbitrary, or substantially arbitrary. In some embodiments, axes 810 and/or 820 may be in logarithmic form, thus allowing large numbers and smaller numbers to both be viewed on a same graph with greater ease.

Graph 800 may plot the data markers for each image from listing 700, thus allowing the frequency of use for each image to be viewed in a single graph. For example, image 706 of listing 700 may have been viewed 25 times, shared 20 times, and requested to be shared 10 times. In this scenario, image 706, which may be the third image of the listing (or "IMAGE #3"), may have data markers 802, 804, and 806 located at position 3 on axis 810 and respectively at values 25, 20, and 10 on axis 820.

In some embodiments, the frequency of use may be used to determine a selection probability value for an image. Data for the amount of times and image is viewed, shared, and/or requested to be shared, may all be factors used to determine that particular image's selection probability value. The selection probability value may be calculated in any suitable manner. For example, the selection probability value may be the aggregate of the number of times an image is viewed, shared, and requested to be shared. As an illustrative example, image 714 may have an aggregate from columns 720, 730, and 740 of six (6) whereas image 710 may have an aggregate of ten thousand five hundred fifty (10,550). In this particular scenario, image 710 may have a higher selection probability value than image 714 because image 710 may have an aggregate value which is much higher.

In some embodiments, the selection probability value may be calculate based on one or more of the number of times an image is viewed, shared, and/or requested to be shared being weighted. For example, the number of times an image as been requested to be shared may be weighted twice that of the number of times an image has been shared. As an illustrative example, image 704 may have been requested to be shared thirty-five times (35), whereas it may have also been shared fifty (50) times. If the number of times an image has been requested to be shared is weighted, for example, twice that of the number of times that the image has been shared, image 702 may now have a value in column 740 of seventy (70), and therefore may obtain a different selection probability value than if it was not weighted double. Persons of ordinary skill in the art will recognize that any combination, permutation, and/or weighting may be used to determine the selection probability value for an image based on any frequency of use characteristics, and the aforementioned examples are merely illustrative. Furthermore, one or more algorithms running on a user's user device and/or on a content management system may be used to calculate the selection probability values.

Figure 9:
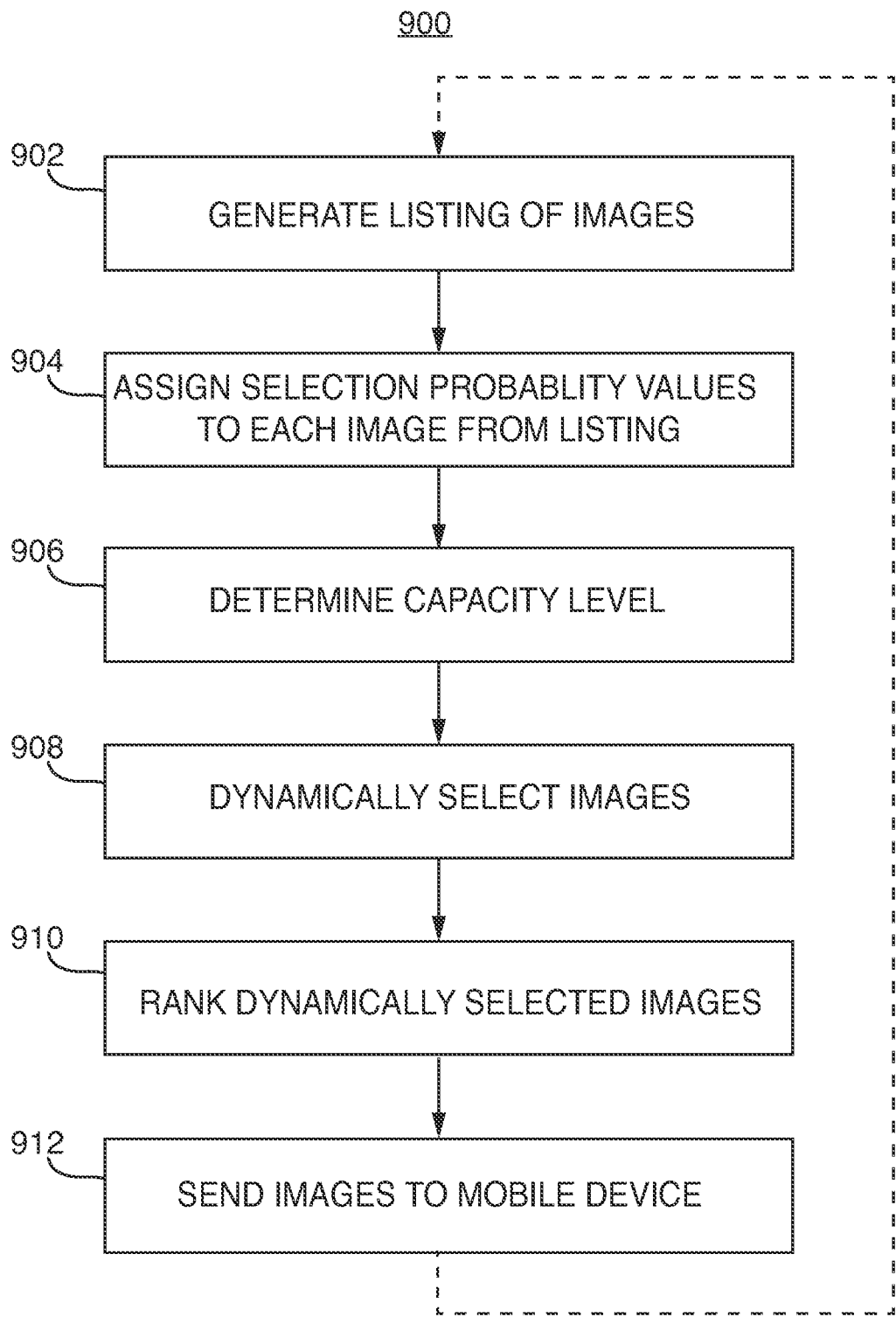
FIG. 9 shows an illustrative flowchart of a process for sending dynamically selected images to a user device in accordance with various embodiments.

FIG. 9 shows an illustrative flowchart of a process for sending dynamically selected images to a user device in accordance with various embodiments. Process 900 may begin at step 902. At step 902, a listing of images may be generated. The listing may include images stored within a user account on a content management system. For example, listing 200 of FIG. 2 may correspond to a listing of some or all images stored within a user account on content management system 100. In some embodiments, the listing may include every image stored within the user account. For example, if the user has one thousand (1,000) images stored within their user account, then each of those one thousand images may be included within the generated listing. In some embodiments, the listing of images may be generated in response to a user input being detected by the content management system. For example, the user may perform an action on an image located within their user account, and in response the listing may be generated.

At step 904, a selection probability value may be assigned to each image within the image. The selection probability value may be based on at least one factor, such as the amount of times an image has been viewed or shared. In some embodiments, the selection probability value may correspond to a likelihood of use of the at least one image. For example, image 710 of FIG. 7 may have been viewed ten thousand (10,000) times, whereas image 714 may have been viewed three (3) times. In this scenario, image 710 may have a selection probability value assigned to it that may be greater than a selection probability value assigned to image 714 based on the number of times that each image has been viewed. In some embodiments, the at least one factor used to determine the selection probability value of an image may correspond to the number of times an image has been shared and/or the number of times an image has been requested to be shared. However, persons of ordinary skill in the art will recognize that any factor may be used to assign a selection probability value to a particular image, and the use of the number of times viewed, shared, and/or requested to share, are merely exemplary.

In some embodiments, multiple factors may be used to determine the selection probability value. For example, the number of times an image has been viewed and shared may both be used to determine the image's selection probability value. In some embodiments, one or more factors may be weighted greater or less than other factors. For example, the amount of times an image has been viewed may be weighted higher than the amount of times an image has been shared. In some embodiments, a recent viewing of a first image from the listing of images and/or a recent viewing of one or more additional images included in a same collection as one of the images from the listing may be used, at least in part, to determine and/or assign the selection probability value to a particular image. For example, a first image may be included in a collection of images from a user's vacation. Within the vacation photos may be a second image that the user may view on their user device. The first image may receive a higher selection probability value because the second image has recently been viewed. In some embodiments, the addition of one or more new images to the user account on the content management system, to a shared virtual space, and/or to a shared virtual space that user belongs, may also be factors that the selection probability value may be based on. In some embodiments, the selection probability value of each image may dynamically update in response to any user interaction with a selected image from the listing of images, the content management system, and/or an additional image from within the listing. For example, the user may decide to share image 206 of FIG. 2, and in response to the detected interaction with the content management system to share the image, each image from within listing 200 may have its selection probability value update.

At step 906, an available capacity level on the user device may be determined. In some embodiments, the user may be presented with user interface 600 indicating current storage levels on their user device. For example, storage bar 610 may indicate to the user that there may be 12 GB of storage space available for storing photos and 4 GB of photos may already be stored on their user device. In some embodiments, user interface 600 may indicate a total amount of storage space occupied and/or available on the user device. For example, only one storage indicator may be present on user interface 600 indicating all available storage levels of the user device.

In some embodiments, determining the available capacity level of the user device may include determining a level of connectivity between the user device and the content management system. For example, if the level of connectivity between the user device and the content management system is very low, the transmission of one or more images to the user device may not be possible or may take a substantially long time. As another example, if the level of connectivity is determined to be across a cellular network instead of over a Wi-Fi connection then the transmission may be paused so that cellular data usage is not taken up by the transmission of images. This may be especially useful if a large amount of images are set to be sent to the user device and the user only has a limited cellular data plan. In some embodiments, determining the available capacity level on the user device may also include detecting whether the user device has an available battery charge exceeding a threshold for transmission. For example, if the user device has a very low battery charge (e.g., 5% charge remaining), the transmission may be paused until the battery charge exceeds a predefined battery threshold needed for transmission (e.g., 20% charge). This may ensure that the user device does not completely drain out its battery charge downloading images so that no charge may be available for the device in case of an emergency.

At step 908, one or more images may be selected from the listing of images. The selected images may, in some embodiments, be selected for transmission to the user device, and the selection may be based on each image's selection probability value and/or the available capacity level of the user device. For example, image 202 may have a selection probability value of 90%, whereas image 210 may have a selection probability value of 5%. If the available capacity level on the user device is such that only one image may be capable of being downloaded to the device, then because image 202 has a higher selection probability value, it may send to the user device instead of image 210. However, if the user device has enough storage space available that all five images from listing 200 may be downloaded, then both images 202 and 210 may be downloaded to the user device along with images 204, 206, and 208.

In some embodiments, selecting images from within the listing to be sent to the user device may also include determining whether any of the images within the listing are already stored locally on the user device. For example, image 204 of listing 200 may already be stored on the user device. In this scenario, sending image 204 as one of the selected images may be repetitive, and therefore that image may not be sent. In some embodiments, one or more systems checks may be performed on the user's user device prior to sending any of the images to determine which images and/or content may already be stored thereon. For example, the systems check may determine the photos stored on the user device as well as the amount of available storage space on the user device.

At step 910, the dynamically selected images may be ranked in order of priority for transmission to the user device. For example, column 230 of FIG. 2 may present a rank for each image from listing 200. The rank may correspond to each image's selection probability value. For example, image 202 of listing 200 may have the highest selection probability value (e.g., 90%), whereas image 210 may have the lowest selection probability value (e.g., 5%). In this scenario, image 202 may have a rank of "A" indicating that it may be first to be sent, whereas image 210 may have a rank of "E" indicating that it may be the last image from listing 200 sent. In some embodiments, the ranking order for transmission may corresponding to the images having the highest selection probability value to the image having the lowest selection probability value. However this is merely exemplary and any ranking order may be used. For example, a threshold probability value may be used, such that any image having a selection probability value below the threshold may not be sent. In some embodiments, the ranking may be in order of the image or images having the lowest selection probability value to the image(s) having the highest selection probability value.

At step 912, the dynamically selected images may be sent to the user device. In some embodiments, the transmission may be performed in ranking order. For example, an image having the ranking of "A" may send before an image having the ranking of "B" or "C". In some embodiments, the images may be sent to storage on the user device. In some embodiments, transmission of the images may continue to occur until the available capacity level of the user device has been met. For example, if only 12 GB of storage space is available on the user device, images may continue to send to the user device until the 12 GB of storage space has been occupied.

In some embodiments, the various steps of process 900 may be repeated periodically at defined time intervals. For example, the steps may repeat hourly, daily, monthly, annually, or at any other time interval. In some embodiments, the user may define the time intervals. For example, the user may have process 900 repeat every six (6) hours. In some embodiments, process 900 may repeat continually. For example, upon transmission of the selected images to the user device completing, a new listing of images within the user account may be generated.

In some embodiments, the various steps of process 900 may repeat in response to an addition of an image to the user account. For example, upon images 312 and 314 being added to the user account, a new listing of images (e.g., listing 300) may be generated and the probability values, and thus rank and order of transmission of the images, may change. In some embodiments, the various steps of process 900 may repeat in response to one or more images being selected to be added. For example, image 312 and 314 may be selected to be added to the user account and process 900 may repeat. In some embodiments, the various steps of process 900 may repeat in response to one or more images being added to a shared virtual space which the user belongs too. For example, the user may add images 502*a-c* of FIG. 5 to a shared virtual space. By adding these images to the shared virtual space, a new listing of images may be generated and selection probability values, and thus a ranking order for transmission, may also occur.

Figure 10:
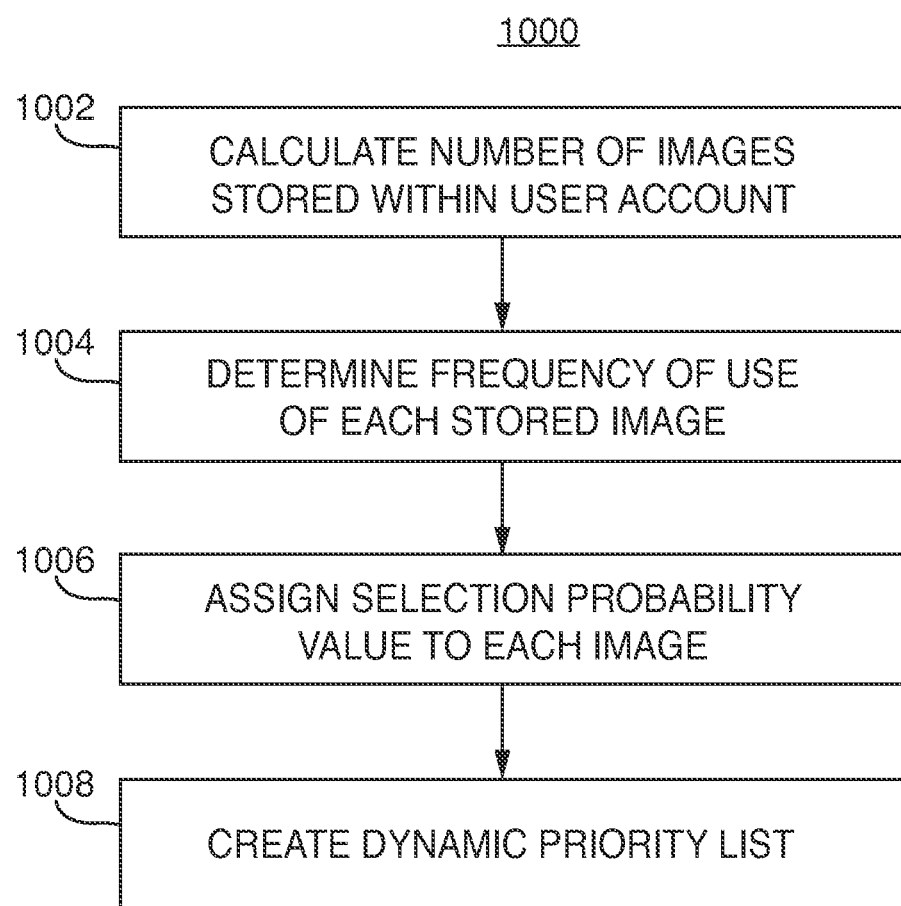
FIG. 10 shows an illustrative flowchart of a process for creating a dynamic priority list in accordance with various embodiments.

FIG. 10 shows an illustrative flowchart of a process for creating a dynamic priority list in accordance with various embodiments. Process 1000 may being at step 1002. At step 1002, a number of images stored within a user account on a content management system may be calculated. For example, a user may store one or more images within their user account on a content management system. The content management system may, in some embodiments, perform a status report to calculate the number of images that the user has stored within their user account. The user may be capable of storing any number of images within their user account. In some embodiments, the user may store other content items within their user account including, but not limited to, videos, audio files (e.g., mp3s), textual documents, or any other file type, or any combination thereof.

At step 1004, a frequency of use for each image calculated to be stored within the user account may be determined. Any frequency of use parameter may be determined, for example, a number of times the image has been viewed. For example, image 702 of FIG. 7 may have been viewed one thousand (1,000) times. In some embodiments, one or more additional parameters may be determined corresponding to an image's frequency of use. For example, a number of times an image has been shared and/or a number of times an image has been requested to be shared may be determined. As another example, the frequency of use may correspond to a determined number of contacts who also have a same image stored within their user account.

At step 1006, a selection probability value may be assigned to each image. In some embodiments, the selection probability value may be based on the determined frequency of use of each image. For example, an image that has been shared numerous times may be assigned a higher selection probability value than an image that has never been shared. The selection probability value assigned to an image may be based on any determined frequency of use. For example, a number of times an image has been viewed, shared, and/or requested to be shared may all contribute to determining the frequency of use of an image. In some embodiments, step 1006 of FIG. 10 may be substantially similar to step 904 of FIG. 9, and the previous description of the latter may apply to the former.

At step 1008, a dynamic priority list may be created for sending images to a user device from the content management system. In some embodiments, the dynamic priority list may rank each image by its assigned selection probability value. For example, listing 200 may have the images included therein ranked based on each image's assigned selection probability value. In some embodiments, the dynamic priority list may also queue the content management system to send images to the user device in order of each image's rank. For example, image 202 of FIG. 2 may have a rank of "A", whereas image 208 may have a rank of "D". Thus, in this scenario, image 202 may be sent prior to image 208 because it has a "higher" rank. Persons of ordinary skill in the art will recognize that any image may be ranked in any order using any parameter, and the use of sending an image with a rank of "A" before an image with a rank of "B" is merely exemplary.

In some embodiments, an amount of available store space on the user device may be calculated. For example, a user device may have 16 GB of total storage space where 4 GB of storage space may already be occupied. In this scenario, there may be 12 GB of storage space calculated to be available on the user device. In some embodiments, in response to calculating the amount of available storage space on the user device, a first amount of images may be sent to the user device. The first amount of images may be of a first resolution. For example, each image within the first amount of images may correspond to a low resolution images (75×75 pixels). In some embodiments, the first amount of images, and their resolution, may be based on the amount of available storage space and each image's rank. For example, if there is only enough storage space to store one high-definition image (e.g., 1080 pixels), then an image having a rank of "A" may be the only image capable of being sent to the user device. However, in this scenario, if there is more than one image having a rank of "A" and/or if there are images having multiple rankings that combined would occupy the same amount of storage space as the one high-definition image, then those images may send to the user device.

In some embodiments, in response to calculating an amount of available storage space on the user device, a first number of images from the dynamic priority list may be determined to be sendable to the user device. The first amount of images may be in a first resolution, which may be based on the calculated available storage space. In some embodiments, a second number of images may be determined to be sendable to the user device in a second resolution based on the available amount of storage space. For example, if there is 2 GB of available storage space on the device, two images having a combined storage space of 1 GB may be sent in a high resolution and 10 images having a combined storage space of 1 GB may also be sent in a lower resolution as well. The aforementioned example is merely one illustration, and any number of images having any resolution may be determined to be sendable to the user device.

In some embodiments, the first number of images in the first resolution may correspond to a first subset of images stored on the content management system having a high-quality resolution. For example, one or more images stored within the user account on the content management system may be of a high-quality resolution (e.g., 1080 pixels), and these images may be sendable to the user device within the first number of images. In some embodiments, the second number of images in the second resolution may correspond to a second subset of images stored on the content management system having a low-quality resolution (e.g., 256 pixels). In some embodiments the first subset of images may include fewer images than the second subset of images, however they may each be of equal size. For example, within 1 GB of storage space, ten (10) high quality images may be sendable, whereas one hundred (100) low quality images may be sendable within the same 1 GB.

Figure 11:
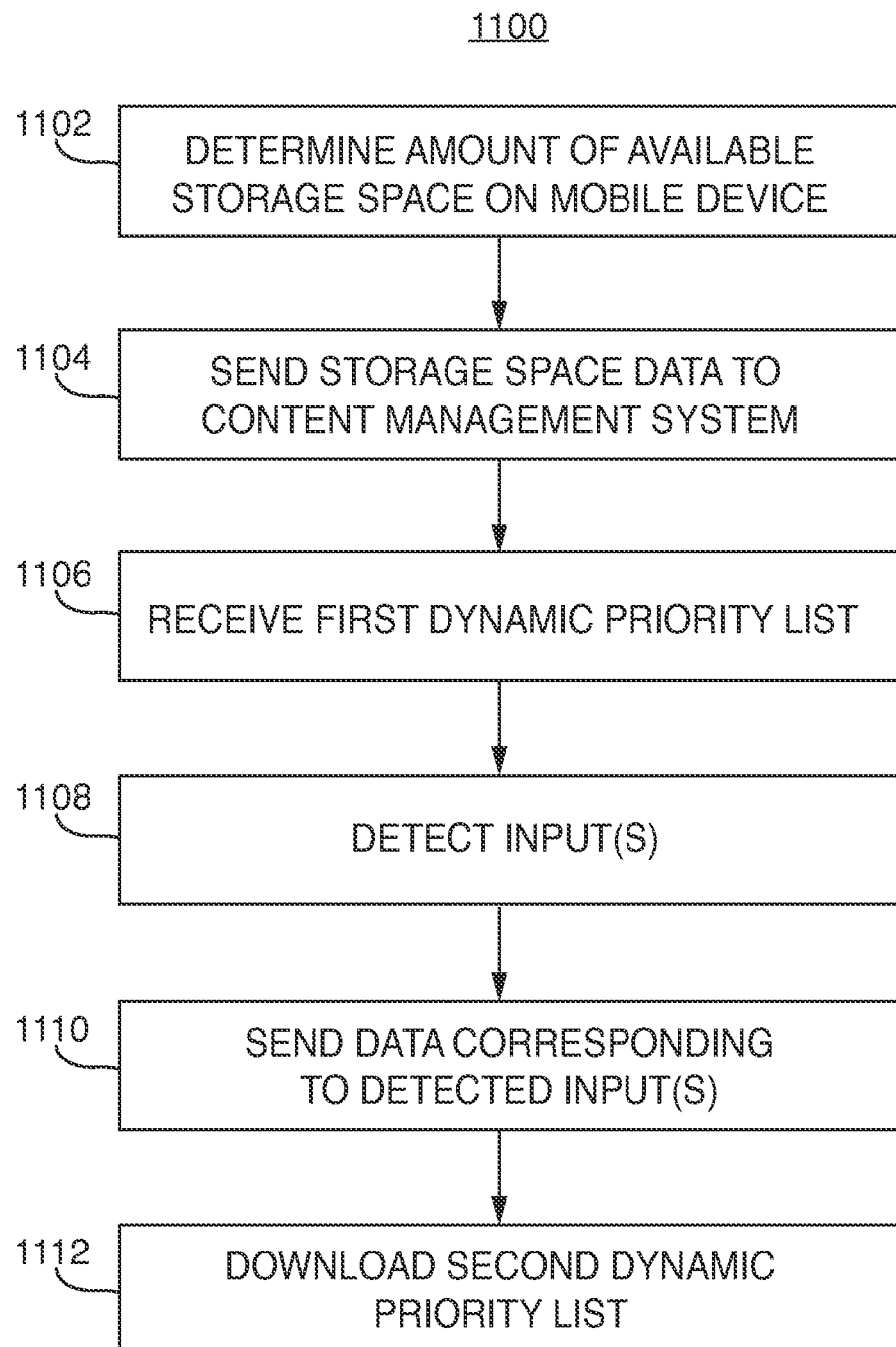
FIG. 11 shows an illustrative flowchart of a process for obtaining images from a content management system in accordance with various embodiments.

FIG. 11 shows an illustrative flowchart of a process for obtaining images from a content management system in accordance with various embodiments. Process 1100 may begin at step 1102. At step 1102, an amount of available storage space on a user device may be determined. For example, user interface 600 of FIG. 6B may display storage bar 610 indicating available storage 616 of 12 GB on a user device. In some embodiments, step 1102 of FIG. 11 may be substantially similar to step 906 of FIG. 9, and the previous description of the latter may apply to the former.

At step 1104, data may be sent to the content management system indicating the determined amount of available storage space on the user device. For example, device 102 may send a system status report to a content management system indicating the current storage levels of the user device. The system status report may be run at specific time intervals and/or upon user request, for example. In some embodiments, the system status report may detail the amount of storage space currently occupied on the user device by various content items. For example, the status report may indicate that the user device may have 4 GB of storage space occupied by photographs out of total storage space 614, and therefore may have 12 GB of storage space available for additional photographs.

At step 1106, a first dynamic priority list may be received from the content management system. The first dynamic priority list may include a first plurality of images that may be ranked in a first order based on a first selection probability value assigned to each image within the list. For example, listing 200 may include images 202, 204, 206, 208, and 210, each having selection probability values assigned to them listed within column 220. In some embodiments, the assigned selection probability values may be used to determine a rank of each image to be sent to the user device from the user account on the content management system. For example, image 202 may have a selection probability value of 90%, whereas image 206 may have a selection probability value of 70%. In this scenario, image 202 may have a rank of "A", whereas image 206 may have a rank of "B". In some embodiments, images may be downloaded or attempted to be downloaded to the user device in ranking order. For example, image 202 may be ranked higher than image 206, and therefore may be downloaded first. Persons of ordinary skill in the art will recognize that any ranking order may be assigned to images within the listing of images, and the use of ranking images based on each image's selection probability value is merely exemplary.

At step 1108, one or more inputs may be detected using the user device. The one or more inputs may be performed on one or more images from the first plurality of images. For example, a user may be presented within listing 200 within a user interface on their user device. In some embodiments, the user may perform a gesture or an action on an image in an attempt to share that image. Any gesture may be performed including, but not limited to, taps, swipes, hovers, audio commands, visual commands, motions, or any other gesture, or any combination thereof.

At step 1110, data corresponding to the detected one or more inputs may be sent to the content management system. For example, the user device may detect that the user may be attempting to share image 202 via one or more gestures performed on the user interface of the user device. In some embodiments, the user device may store the data corresponding to the gestures in one or more data files or gesture detection files, and send those files to the content management system.

At step 1112, a second dynamic priority list may be downloaded in response to the data corresponding to the detected input being sent to the content management system. In some embodiments, the second dynamic priority list may include a second plurality of images ranked in a second order based on a second selection probability value being assigned to each image. For example, the second selection probability value may correspond to the change in the likelihood of a particular image being viewed after the detected gesture. Listing 300 may include, for example, image 308, which may be substantially similar to image 208 from listing 200. Image 208 may have initially had a selection probability value of 20% and a transmission ranking of "D". In response to the detected input adding images 312 and 314 to the listing, the selection probability value of image 308 may now be lower than before due to a lower likelihood of viewing this particular image. For example, image 308 may be assigned a selection probability value of 5% corresponding to a transmission ranking of "G".

In some embodiments, the detected input or inputs may cause the first probability value assigned to each image within the listing to change to a second probability value. For example, if the user attempts to share image 206, the selection probability value for that image change in response to the detected input. In this scenario, image 206, which may have initially had a selection probability value of 70%, may change to now correspond to image 306 of listing 300, having a selection probability value of 85%. In some embodiments, sending the detected input data may be repeated periodically at specific time intervals. For example, the input data may be sent to the content management system from the user device every hour, or every day. In some embodiments, the first and second dynamic priority list may each be modified based on the transmission of the detected input data at each time interval. For example, each time the input data may be sent to the content management system, the dynamic priority list may update.

In some embodiments, at least two sets of images may be received on the user device that may be selected as the first dynamic priority list. For example, the two sets of images may each be included within the listing of images used to create the first dynamic priority list. In some embodiments, the at least two sets of images may include a first set of images and a second set of images. The first set of images may include a first number of images each having a first resolution. For example, the first set of images may be a first set of high-definition images. The second set of images may include a second number of images each having a second resolution. For example, the second set of images may be a set of thumbnail resolution images. In some embodiments, both the first set of images and the second set of images may include the same number of images. For example, the first set of images may include ten (10) images, and the second set of images may also include ten (10) images. In some embodiments, the first resolution may correspond to a higher resolution than the second resolution. For example, the first resolution may correspond to high definition images (e.g., 1080 pixels) whereas the second resolution may correspond to low definition images (e.g., 256 pixels).

Figure 12:
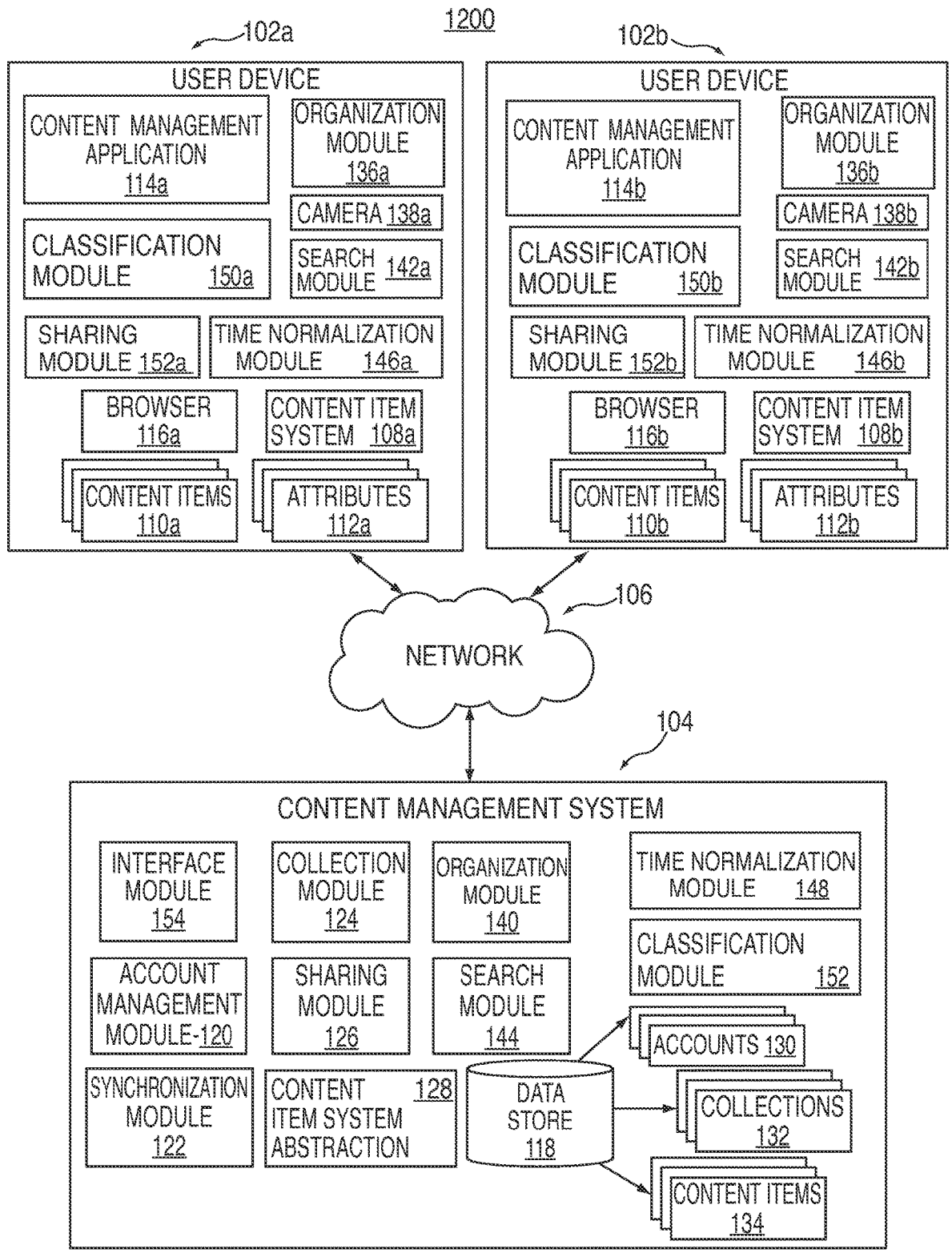
FIG. 12 shows another exemplary system in accordance with various embodiments.

FIG. 12 shows an exemplary system in accordance with various embodiments. In some embodiments, system 1200 of FIG. 12 may be substantially similar to system 100 of FIG. 1, with the exception that the former may present elements of system 100 at a more granular level (e.g., modules, applications, etc.).

In some embodiments, user devices 102 may be used to create, access, modify, and manage content items, such as content items 110a and 110b (collectively 110), stored locally within content item system 108a and 108b (collectively systems 108) on user device 102 and/or stored remotely on content management system 104 (e.g., within data store 118). For example, user device 102a may access content items 110b stored remotely with data store 118 of content management system 104 and may, or may not, store content item 110b locally within content item system 108a on user device 102a. Continuing with the example, user device 102a may temporarily store content item 110b within a cache locally on user device 102a, make revisions to content item 110b, and the revisions to content item 110b may be communicated and stored in data store 118 of content management system 104. Optionally, a local copy of content item 110a may be stored on user device 102a. In some embodiments, data store 118 may include one or more collections 132 of content items. For example, collections 132 may include one or more content items having similar properties (e.g., metadata) and/or including similar content.

In some embodiments, user devices 102 may include camera 138 (e.g., 138a and 138b) to capture and record digital images and/or videos. User devices 102 may capture, record, and/or store content items, such as images, using camera 138. For example, camera 138 may capture and record images and store metadata with the images. Metadata may include, but is not limited to, the following: creation time timestamp, geolocation, orientation, rotation, title, and/or any other attributes or data relevant to the captured image. Metadata values may be stored as attribute 112 name-value pairs, tag-value pairs, and/or any other method, or any combination thereof, to associate the metadata with the content item and easily identify the type of metadata. In some embodiments, attributes 112 may be tag-value pairs defined by a particular standard, including, but not limited to, Exchangeable Image File Format ("Exif"), JPEG File Interchange Format (Jfif), and/or any other standard.

In some embodiments, user devices 102 may include time normalization module 146, and content management system 104 may include time normalization module 148. Time normalization module 146 (e.g., 146a and 146b) may be used to normalize dates and times stored with a content item. Time normalization module 146, counterpart time normalization module 148, and/or any combination thereof, may be used to normalize dates and times stored for content items. The normalized times and dates may be used to sort, group, perform comparisons, perform basic math, and/or cluster content items.

In some embodiments, user devices 102 may include organization module 136, and content management system 104 may include organization module 140. Organization module 136 (e.g., 136a and 136b) may be used to organize content items into clusters or collections of content items, organize content items to provide samplings of content items for display within user interfaces, and/or retrieve organized content items for presentation. Organization module 136 may utilize any clustering algorithm. Organization module 136 may be used to identify similar content items for clusters in order to organize content items for presentation within user interfaces on user devices 102 and content management system 104. Similarity rules may be defined to create one or more numeric representations embodying information on similarities between each of the content items in accordance with various similarity rules. Organization module 136 may use numeric representations as a reference for similarity between content items in order to cluster the content items.

In some embodiments, content items may be organized into clusters to aid with retrieval of similar content items in response to search requests. For example, organization module 136a may identify that two images are similar and may group the images together in a cluster. Organization module 136a may process content items to determine clusters independently and/or in conjunction with counterpart organization module (e.g., 140 and/or 136b). In other embodiments, organization module 136a may only provide clusters identified with counterpart organization modules (e.g., 140 and/or 136b) for presentation. Continuing with this example, processing of content items to determine clusters may be an iterative process that may be executed upon receipt of new content items and/or new similarity rules.

In some embodiments, user device 102a may include classification module 150a, while user device 102b may include classification module 150b (collectively 150), which may be used independently, in combination with classification module 152 include on content management system 104, and/or any combination thereof to classify content items, rectify content items, and/or classify images. For example, the classification modules 150 and/or 152 may be used to determine if an image includes a document, and if there so, determine a type of document stored therein. Content item rectification may be performed to correct, perform further transformations, and/or crop content items to improve the display of the content items (e.g., correct the display of a document within an image).

In some embodiments, user device 102a may include search module 142a, while user device 102b may include search module 142b, which collectively may be referred to as search modules 142. Content management system 104 may also be provided with counterpart search module 144. Each of search modules 142 and 144 may be capable of supporting searches for content items located on both user devices 102 and/or content management system 104. A search request may be received by search module 142 and/or 144 that requests one or more content items. In some embodiments, the search may be handled by searching metadata and/or attributes assigned to content items during the provision of management services. For example, cluster markers stored with content items may be used to find content items by date. In this particular scenario, cluster markers may indicate an approximate time, or average time, for the content items stored with the cluster marker, and the marker may be used to speed the search and/or return the search results with the contents of the cluster with particular cluster markers.

Content items 110 managed by content management system 104 may be stored locally within content item system 108 of respective user devices 102 and/or stored remotely within data store 118 of content management system 104 (e.g., content items 134 in data store 118). Content management system 104 may provide synchronization of content items managed thereon. Attributes 112a and 112b (collectively 112) or other metadata may also be stored with content items 110. For example, a particular attribute may be stored with a content item to track content items locally stored on user devices 102 that are managed and/or synchronized by content management system 104. In some embodiments, attributes 112 may be implemented using extended attributes, resource forks, or any other implementation that allows for storing metadata with a content item that is not interpreted by a content item system, such as content item system 108. In particular, attributes 112*a* and 112*b* may be content identifiers for content items. For example, the content identifier may be a unique or nearly unique identifier (e.g., number or string) that identifies the content item. By storing a content identifier with the content item, the content item may be tracked. For example, if a user moves the content item to another location within content item system 108 hierarchy and/or modifies the content item, then the content item may still be identified within content item system 108 of user device 102. Any changes or modifications to the content item identified with the content identifier may be uploaded or provided for synchronization and/or version control services provided by content management system 104.

A stand-alone content management application 114*a* and 114*b* (collectively 114), client application, and/or third-party application may be implemented on user devices 102*a* and 102*b*, respectively, to provide a user interface to a user for interacting with content management system 104. Content management application 114 may expose the functionality provided with content management interface module 154 and accessible modules for user device 102. Web browser 116*a* and 116*b* (collectively 116) may be used to display a web page front end for a client application that may provide content management 104 functionality exposed/provided with content management interface module 154.

Content management system 104 may allow a user with an authenticated account to store content, as well as perform management tasks, such as retrieve, modify, browse, synchronize, and/or share content with other accounts. Various embodiments of content management system 104 may have elements including, but not limited to, content management interface module 154, account management module 120, synchronization module 122, collections module 124, sharing module 126, file system abstraction 128, data store 118, and organization module 140. Content management interface module 154 may expose the server-side or back end functionality/capabilities of content management system 104. For example, a counter-part user interface (e.g., stand-alone application, client application, etc.) on user devices 102 may be implemented using content management interface module 154 to allow a user to perform functions offered by modules of content management system 104.

The user interface displayed on user device 102 may be used to create an account for a user and/or authenticate the user to use the account using account management module 120. Account management module 120 may provide the functionality for authenticating use of an account by a user and/or user device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., content item edit history), maximum storage space authorized, storage space used, content storage locations, security settings, personal configuration settings, content sharing data, etc. An amount of storage space on content management system 104 may be reserved, allotted, allocated, stored, and/or may be accessed with an authenticated account. The account may be used to access content items 134 and/or content items 110 within data store 118 for the account, and/or content items 134 and/or content items 110 made accessible to the account that are shared from another account. In some embodiments, account management module 120 may interact with any number of other modules of content management system 104.

An account on content management system 104 may, in some embodiments, be used to store content such as documents, text items, audio items, video items, etc., from one or more user devices 102 authorized by the account. The content may also include collections of various types of content with different behaviors, or other mechanisms of grouping content items together. For example, an account may include a public collection that may be accessible to any user. In some embodiments, the public collection may be assigned a web-accessible address. A link to the web-accessible address may be used to access the contents of the public folder. In another example, an account may include a photos collection that may store photos and/or videos, and may provide specific attributes and actions tailored for photos and/or videos. The account may also include an audio collection that provides the ability to play back audio items and perform other audio related actions. The account may still further include a special purpose collection. An account may also include shared collections or group collections that may be linked with and available to multiple user accounts. In some embodiments, access to a shared collection may differ for different users that may be capable of accessing the shared collection.

Content items 110 and/or content items 134 may be stored in data store 118. Data store 118 may, in some embodiments, be a storage device, multiple storage devices, or a server. Alternatively, data store 118 may be cloud storage provider or network storage accessible via one or more communications networks. Content management system 104 may hide the complexity and details from user devices 102 by using content item system abstraction 128 (e.g., a content item system database abstraction layer) so that user devices 102 do not need to know exactly where the content items are being stored by content management system 104. Embodiments may store the content items in the same collections hierarchy as they appear on user device 102. Alternatively, content management system 104 may store the content items in various orders, arrangements, and/or hierarchies. Content management system 140 may store the content items in a network accessible storage (SAN) device, in a redundant array of inexpensive disks (RAID), etc. Content management system 104 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a content item system, or any other collection of data. In some embodiments, each content item stored in data store 118 may be assigned a system-wide unique identifier.

Data store 118 may, in some embodiments, decrease the amount of storage space required by identifying duplicate content items or duplicate chunks of content items. Instead of storing multiple copies, data store 118 may store a single copy of content item 134 and then use a pointer or other mechanism to link the duplicates to the single copy. Similarly, data store 118 may store content items 134 more efficiently, as well as provide the ability to undo operations, by using a content item version control that tracks changes to content items, different versions of content items (including diverging version trees), and a change history. The change history may include a set of changes that, when applied to the original content item version, produce the changed content item version.

Content management system 104 may be configured to support automatic synchronization of content from one or more user devices 102. The synchronization may be platform independent. That is, the content may be synchronized across multiple user devices 102 of varying type, capabilities, operating systems, etc. For example, user device 102a may include client software, which synchronizes, via synchronization module 122 at content management system 104, content in content item system 108 of user devices 102 with the content in an associated user account. In some cases, the client software may synchronize any changes to content in a designated collection and its sub-collection, such as new, deleted, modified, copied, or moved content items or folders. In one example of client software that integrates with an existing content management application, a user may manipulate content directly in a local folder, while a background process monitors the local content item for changes and synchronizes those changes to content management system 104. In some embodiments, a background process may identify content that has been updated at content management system 104 and synchronize those changes to the local collection. The client software may provide notifications of synchronization operations, and may provide indications of content statuses directly within the content management application. In some embodiments, user device 102 may not have a network connection available. In this scenario, the client software may monitor the linked collection for content item changes and queue those changes for later synchronization to content management system 104 when a network connection is available. Similarly, a user may manually stop or pause synchronization with content management system 104.

A user may also view or manipulate content via a web interface generated and served by content management interface module 154. For example, the user may navigate in a web browser to a web address provided by content management system 104. Changes or updates to content in data store 118 made through the web interface, such as uploading a new version of a content item, may be propagated back to other user devices 102 associated with the user's account. For example, multiple user devices 102, each with their own client software, may be associated with a single account, and content items in the account may be synchronized between each of user devices 102.

Content management system 104 may include sharing module 126 for managing sharing content and/or collections of content publicly or privately. Sharing module 126 may manage sharing independently or in conjunction with counterpart sharing module 152a, located on user device 102a, and sharing module 152b located on user device 102b (collectively sharing modules 152). Sharing content publicly may include making the content item and/or the collection accessible from any device in network communication with content management system 104. Sharing content privately may include linking a content item and/or a collection in data store 118 with two or more user accounts so that each user account has access to the content item. The sharing may be performed in a platform independent manner. That is, the content may be shared across multiple user devices 102 of varying type, capabilities, operating systems, etc. For example, one or more share links may be provided to a user, or a contact of a user, to access a shared content item. The content may also be shared across varying types of user accounts. In particular, the sharing module 126 may be used with collections module 124 to allow sharing of a virtual collection with another user or user account. A virtual collection may be a collection of content identifiers that may be stored in various locations within content item systems 108 of user device 102 and/or stored remotely at content management system 104.

In some embodiments, the virtual collection for an account with a content management system may correspond to a collection of one or more identifiers for content items (e.g., identifying content items in storage). The virtual collection is created with collections module 124 by selecting from existing content items stored and/or managed by content management system and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item to a directory) the content item in another location within data storage in order to place the content item in the collection.

In some embodiments, content management system 104 may be configured to maintain a content directory or a database table/entity for content items where each entry or row identifies the location of each content item in data store 118. In some embodiments, a unique or a nearly unique content identifier may be stored for each content item stored in data store 118.

In some embodiments, metadata may be stored for each content item. For example, metadata may include a content path that may be used to identify the content item. The content path may include the name of the content item and a content item hierarchy associated with the content item (e.g., the path for storage locally within a user device 102). Content management system 104 may use the content path to present the content items in the appropriate content item hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator ("URL"), which allows any web browser to access the content in content management system 104 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be sent to content management system 104 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be sent to content management system 104 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or "false" to indicate that a URL to the content item has not been created. Sharing module 126 may be configured to change the value of the flag to 1 or "true" after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This may allow a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for dynamically selecting and sending content items to a user device based on various network and device conditions, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:

1. A method, comprising:
    generating a listing of images stored within a user account on a content management system for selectively sending to a user device;
    determining a frequency of use for each image within the listing of images based on one or more of a number of times each image is viewed, a number of times each image is shared, or a number of times each image is requested to be shared;
    assigning a selection probability value to each image from the listing based on the frequency of use for each image within the listing of images;
    determining an available storage capacity level on the user device;
    based at least on the available storage capacity level on the user device, determining a storage allocation on the user device for locally storing, independent of connectivity to the content management system, high-resolution images from the listing of images stored within the user account on the content management system;

based on the selection probability value for each image from the listing of images and the storage allocation on the user device corresponding to high-resolution images, selecting a first set of images from the listing of images to send to the user device as high-resolution images, wherein the first set of high-resolution images occupies a first amount of storage space;

based on the selection probability value for each image from the listing of images, the available storage capacity level on the user device, and the first amount of storage space, selecting a second set of images from the listing of images to send to the user device as low-resolution images, wherein the second set of low-resolution images occupies a second amount of storage space, and wherein the second set of low-resolution images are different than the first set of high-resolution images;

sending, from the content management system, the first set of high-resolution images and the second set of low-resolution images to the user device, wherein a combination of the first amount of storage space and the second amount of storage space occupy less than or equal to the available storage capacity on the user device;

determining a change in a selection probability value of at least one image of the first set of high-resolution images; and in response to determining the change in the selection probability value of the at least one image of the first set of high-resolution images, sending instructions to the user device to remove the at least one image from the user device.

2. The method of claim 1, wherein assigning the selection probability value to each image from the listing of images is further based on at least one factor comprising one or more of:
   an addition of at least one image to a shared virtual space;
   an addition of at least one image from the listing to a shared virtual space; or
   an addition of at least one image to a shared virtual space from the user device.

3. The method of claim 2, wherein the shared virtual space comprises one or more of:
   a shared virtual space created by a user of the user device;
   a shared virtual space created by a contact of the user;
   a shared virtual space that the user has been invited to; or
   a shared virtual space that the user is associated with already.

4. The method of claim 1, wherein assigning the selection probability value to each image from the listing of images is further based on a notification corresponding to an image from the listing of images being sent to the user device from the content management system.

5. The method of claim 1, wherein the selection probability value of an image from the listing of images indicates a likelihood that a user will view the image on the user device.

6. The method of claim 1, wherein assigning the selection probability value to each image from the listing is further based on at least one factor comprising one or more of:
   a recent viewing of an image from the listing;
   a recent viewing of at least one additional image located within one or more of: a same collection, a same event, or a same category as any image from the listing; or
   an addition of at least one new image to the user account.

7. The method of claim 1, wherein the selection probability value assigned to each image from the listing of images is updated in response to one or more of:
   an addition of at least one image from the listing of images to a shared virtual space that a user belongs to;
   an addition of at least one new image to the user account; or
   a selection to view at least one image stored in the user account.

8. The method of claim 1, wherein sending instructions to the user device to remove the at least one image of the first set of high-resolution images comprises sending, to the user device, a low-resolution version of the at least one image of the first set of high-resolution images to replace the at least one image of the first set of high-resolution images.

9. The method of claim 1, wherein generating the listing of images further comprises generating the listing of images in response to detecting a user input to the content management system.

10. The method of claim 1, wherein the selection probability value assigned to each image updates in response to any user interaction with one or more of:
    a selected image from the listing;
    the content management system; or
    an additional image from within the listing.

11. The method of claim 1, further comprising:
    determining a level of connectivity between the user device and the content management system; and
    wherein determining to send to the user device an amount of the first set of high-resolution images and an amount of the second set of low-resolution images is based at least in part on the level of connectivity between the user device and the content management system.

12. The method of claim 1, further comprising ranking the listing of images from highest selection probability value to lowest selection probability value.

13. A non-transitory computer readable medium comprising instructions that, when executed by at least one processor of a computing device, cause the computing device to:
    identify a listing of images stored within a user account on a content management system;
    determine a frequency of use for each image from the listing of images;
    assign a selection probability value to each image from the listing of images based on the determined frequency of use for each image;
    create a priority list for selectively sending images to a user device from the content management system, wherein the priority list ranks each image within the listing of images based on the selection probability value assigned to each image;
    determine an available storage capacity level of the user device;
    based at least on the available storage capacity level on the user device, determine a storage allocation on the user device for locally storing, independent of connectivity to the content management system, high-resolution images from the listing of images stored within the user account on the content management system;
    based on the priority list and the storage allocation on the user device for locally storing, independent of connectivity to the content management system, high-resolution images, select a first set of images from the listing of images to send to the user device as high-resolution images, wherein the first set of high-resolution images occupies a first amount of storage space;

based on the priority list, the available storage capacity on the user device, and the first amount of storage space, select a second set of images from the listing of images to send to the user device as low-resolution images, wherein the second set of low-resolution images occupies a second amount of storage space, and wherein the second set of low-resolution images are different than the first set of high-resolution images;

send, to the user device, the first set of high-resolution images and the second set of low-resolution images, wherein a combination of the first amount of storage space and the second amount of storage space occupy less than or equal to the available storage capacity on the user device;

determine a change in a selection probability value of at least one image of the first set of high-resolution images; and in response to determining the change in the selection probability value of the at least one image of the first set of high-resolution images, send instructions to the user device to remove the at least one image from the user device.

14. The non-transitory computer readable medium of claim 13, wherein determining the frequency of use for each image from the listing of images further comprises determining one or more of:
an amount of times each image has been shared;
an amount of times each image has been requested to be shared;
an amount of times each image has been viewed; or
a number of contacts associated with the user account that stores each image within a contact user account.

15. The non-transitory computer readable medium of claim 13, further comprising instructions that, when executed by the at least one processor of the computing device, cause the computing device to update the available storage capacity on the user device based on sending the first set of high-resolution images and the second set of low-resolution images.

16. The non-transitory computer readable medium of claim 13, further comprising instructions that, when executed by the at least one processor of the computing device, cause the computing device to determine a level of connectivity between the user device and the content management system.

17. The non-transitory computer readable medium of claim 16, further comprising instructions that, when executed by the at least one processor of the computing device, cause the computing device to determine an amount of the first set of high-resolution images from the listing of images based on the level of connectivity between the user device and the content management system.

18. The non-transitory computer readable medium of claim 17, wherein the first set of high-resolution images comprises fewer images than the second set of low-resolution images.

19. A system, comprising:
at least one processor; and
a non-transitory computer readable medium comprising instructions that, when executed by the at least one processor, cause the system to:
receive, from a user device corresponding to a user account within a content management system, an indication of an amount of available storage space on the user device;
generate, by the content management system, a selection probability value for each image of a plurality of images stored within the user account on the content management system;
determine an available storage capacity level on the user device;
based at least on the available storage capacity level on the user device, determine a storage allocation on the user device for locally storing, independent of connectivity to the content management system, high-resolution images from the plurality of images;
based on the selection probability value for each image of the plurality of images and the storage allocation on the user device for locally storing, independent of connectivity to the content management system, high-resolution images, select a first set of images from the plurality of images to send to the user device as high-resolution images from the content management system, wherein the first set of high-resolution images occupies a first amount of storage space;
based on the selection probability value for each image of the plurality of images, the amount of available storage space on the user device, and the first amount of storage space, select a second set of images from the plurality of images to send to the user device as low-resolution images from the content management system, wherein the second set of low-resolution images occupies a second amount of storage space;
send, from the content management system, the first set of high-resolution images and the second set of low-resolution images to the user device, wherein a combination of the first amount of storage space and the second amount of storage space occupy less than or equal to the amount of available storage space on the user device;
determine a change in a selection probability value of at least one image of the first set of high-resolution images; and
in response to determining the change in the selection probability value of the at least one image of the first set of high-resolution images, send instructions to the user device to remove the at least one image from the user device.

20. The system of claim 19, wherein the first set of high-resolution images comprises a different number of images than the second set of low-resolution images.

21. The system of claim 20, wherein the first amount of storage space is less than or equal to the second amount of storage space.

22. The system of claim 19, wherein generating the selection probability value for each image of the plurality of images is based, at least in part, on a frequency of use for each image within the plurality of images.

23. The system of claim 19, further comprising instructions that, when executed by the at least one processor, cause the system to
determine the change in the selection probability value for the at least one image of the first set of high-resolution images based on generating updated selection probability values for each image of the plurality of images.

24. The system of claim 23, further comprising instructions that, when executed by the at least one processor, cause the system to generate the updated selection probability values for each image of the plurality of images in response to receiving, from the user device, an indication of user interaction with one or more images of the first set of high-resolution images or the second set of low-resolution images sent to the user device.

25. The system of claim 24, wherein the indication of the user interaction comprises an indication that the user device shared the one or more images with another user device.

26. The system of claim 19, further comprising instructions that, when executed by the at least one processor, cause the system to send instructions to the user device to remove the at least one image of the first set of high-resolution images by
   sending, to the user device, a low-resolution version of the at least one image of the first set of high-resolution images to replace the at least one image from the first set of high-resolution images.

27. The system of claim 19, wherein the plurality of images on the content management system occupies more storage space than the amount of available storage space on the user device.

28. The system of claim 19, further comprising instructions that, when executed by the at least one processor, cause the system to:
   determine a level of connectivity between the user device and the content management system; and
   prioritize the sending of the first set of high-resolution images and the second set of low-resolution images to the user device based on the level of connectivity between the user device and the content management system.

* * * * *